(12) United States Patent
Saito et al.

(10) Patent No.: US 7,817,146 B2
(45) Date of Patent: Oct. 19, 2010

(54) SHEET, DISPLAY MEDIUM UNIT, SHEET ATTACHING DEVICE, AND SHEET DETACHING DEVICE

(75) Inventors: Yasunori Saito, Ebina (JP); Naoki Hayashi, Ebina (JP); Tsutomu Ishii, Ebina (JP); Minoru Koshimizu, Ebina (JP); Hiroyuki Hotta, Ebina (JP); Masao Watanabe, Ashigarakami-gun (JP); Hiroyuki Funo, Ashigarakami-gun (JP); Kiyoshi Iida, Ashigarakami-gun (JP); Ryota Mizutani, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1112 days.

(21) Appl. No.: 11/206,101

(22) Filed: Aug. 18, 2005

(65) Prior Publication Data
US 2006/0209354 A1 Sep. 21, 2006

(30) Foreign Application Priority Data
Mar. 16, 2005 (JP) .............................. 2005-075838

(51) Int. Cl.
*H04N 1/00* (2006.01)
(52) U.S. Cl. ...................................... 345/177; 345/107
(58) Field of Classification Search ................. 358/406, 358/514; 345/173–177, 163, 206, 107, 179
See application file for complete search history.

(56) References Cited

U.S. PATENT DOCUMENTS

| | | | | |
|---|---|---|---|---|
| 6,260,415 | B1 * | 7/2001 | Goebel et al. | 73/588 |
| 6,690,455 | B2 * | 2/2004 | Fujinaka | 356/121 |
| 2003/0020701 | A1 * | 1/2003 | Nakamura et al. | 345/204 |
| 2003/0102984 | A1 * | 6/2003 | Elsner et al. | 340/870.16 |
| 2004/0074303 | A1 * | 4/2004 | Matsiev et al. | 73/579 |
| 2004/0155833 | A1 * | 8/2004 | Ishii et al. | 345/1.1 |
| 2004/0212600 | A1 * | 10/2004 | Kodama et al. | 345/173 |
| 2005/0073508 | A1 * | 4/2005 | Pittel et al. | 345/175 |
| 2005/0184159 | A1 * | 8/2005 | Hattori et al. | 235/462.45 |
| 2005/0240778 | A1 * | 10/2005 | Saito | 713/186 |
| 2006/0017659 | A1 * | 1/2006 | Ogawa et al. | 345/30 |
| 2006/0125492 | A1 * | 6/2006 | Andarawis et al. | 324/667 |
| 2006/0125804 | A1 * | 6/2006 | Kent | 345/177 |
| 2006/0214775 | A1 * | 9/2006 | Watanabe et al. | 340/10.41 |

FOREIGN PATENT DOCUMENTS

JP  A-2002-090716  3/2002

\* cited by examiner

*Primary Examiner*—Amr Awad
*Assistant Examiner*—Tony Davis
(74) *Attorney, Agent, or Firm*—Oliff & Berridge, PLC

(57) ABSTRACT

The present invention provides a sheet with plural wireless measuring units, each of which, when a radio signal is sent, measures physical quantity surrounding itself by using the radio signal as an energy source, and generates and sends a radio signal having an attribute reflecting the measured physical quantity.

20 Claims, 12 Drawing Sheets

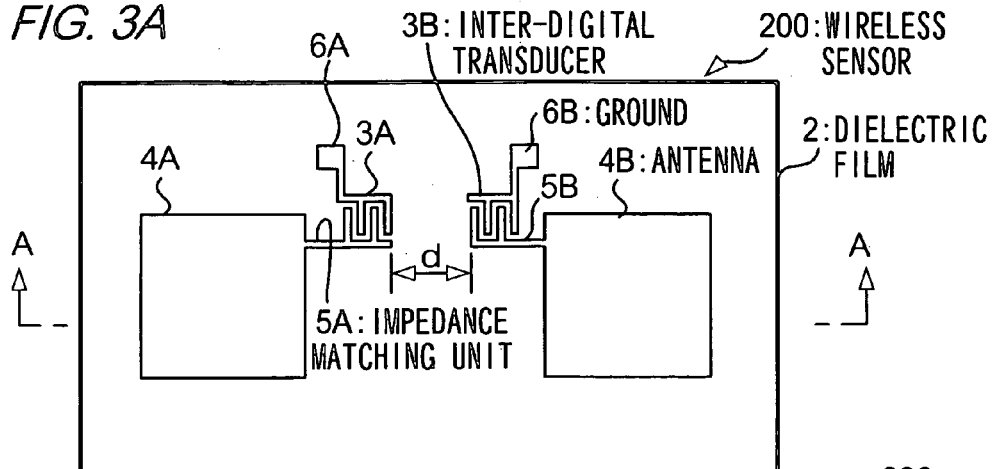
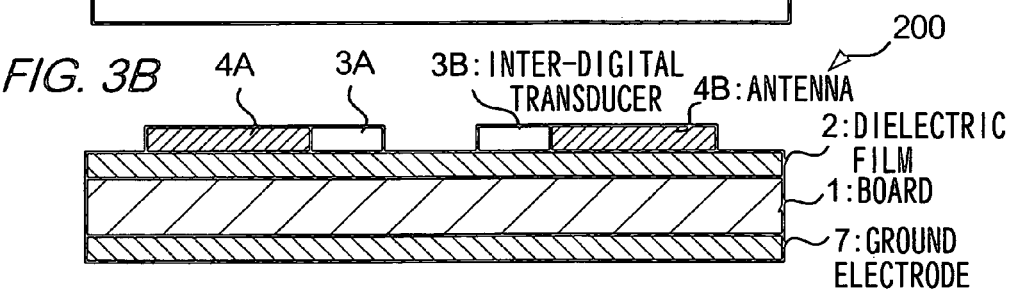
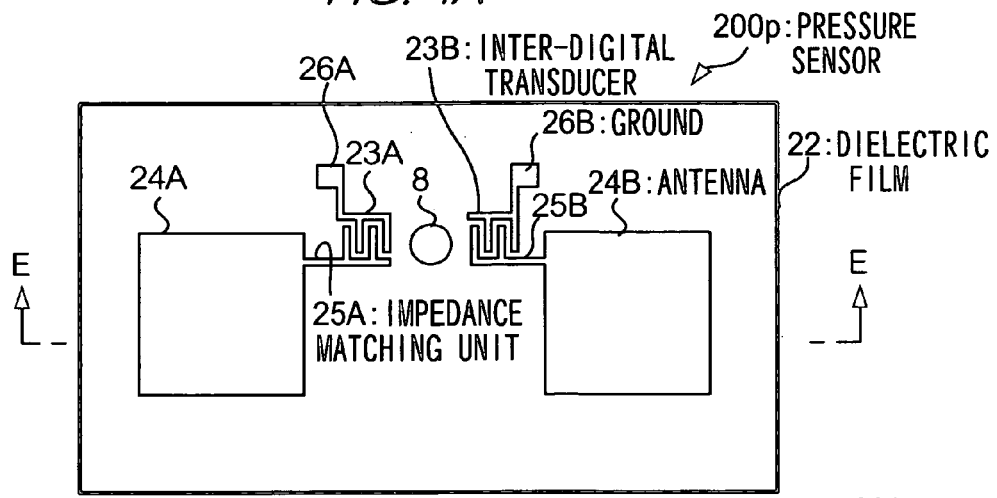
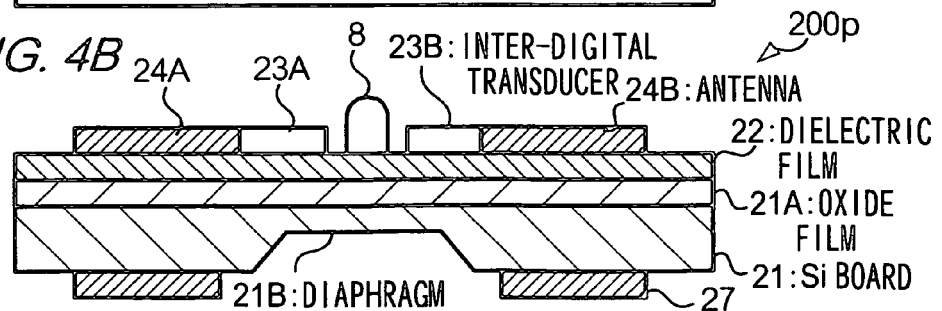

FIG. 8
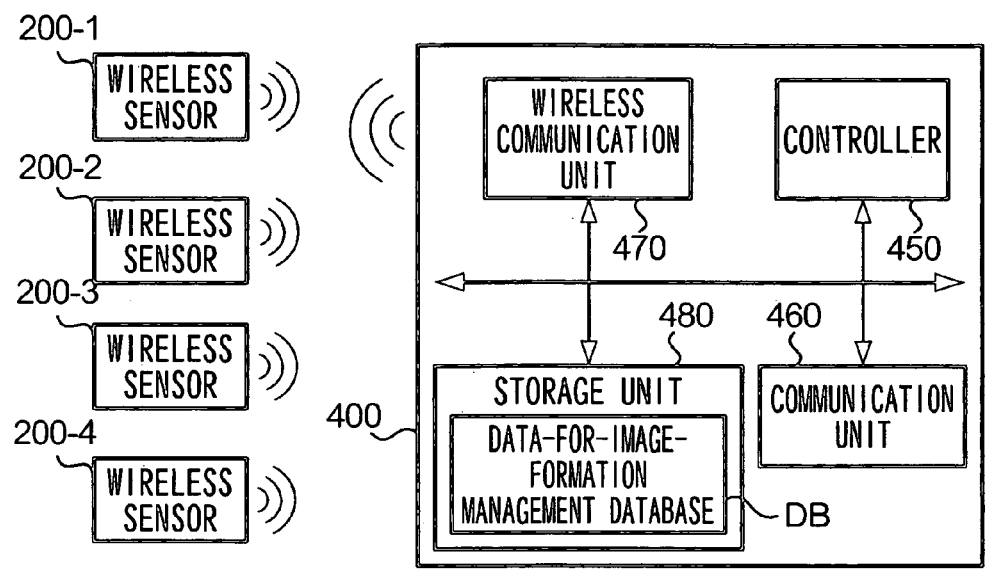
FIG. 9
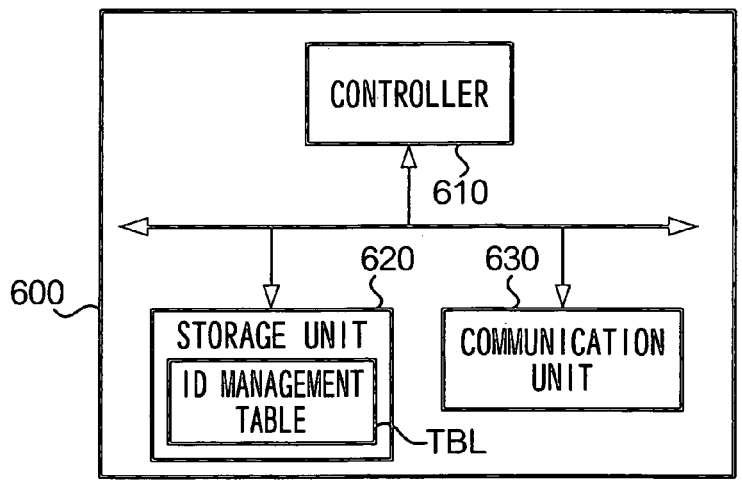
FIG. 10
| ELECTRONIC PAPER ID | SENSOR SHEET ID 1 | SENSOR SHEET ID 2 | DATA ID |
|---|---|---|---|
| ○ ○ ○ | ○ ○ ○ | ○ ○ ○ | ○ ○ ○ |
| ○ ○ ○ | ○ ○ ○ | ○ ○ ○ | ○ ○ ○ |
| ○ ○ ○ | ○ ○ ○ | ○ ○ ○ | ○ ○ ○ |

# SHEET, DISPLAY MEDIUM UNIT, SHEET ATTACHING DEVICE, AND SHEET DETACHING DEVICE

This application claims priority under 35 U.S.C. §119 of Japanese Patent Application No. 2005-75838 filed on Mar. 16, 2005, the entire content of which is hereby incorporated by reference.

BACKGROUND OF THE INVENTION

1. Field of the Invention

The present invention relates to a technique of controlling a display medium such as an electronic paper.

2. Description of the Related Art

In recent years, a display medium with an image display function referred to as electronic paper, which has both the functionality of paper and the convenience of electronic display, has come into use. The electronic paper is re-writable over and over again, and is able to store contents displayed thereon for long periods of time. For example, in a photo-addressable electronic paper disclosed in Japanese Patent Application Laid-open Publication No. 2002-90716, information can be written therein over and over again using the light of a display, and written information is stored semi-permanently in that, data remains saved unless deleted or over-written by new information.

If a display medium such as the electronic paper discussed above can recognize an environmental condition surrounding itself such as temperature, pressure, light, or acceleration, it would be possible to provide services using the recognition result. For example, if a display medium can determine, by measuring the pressure applied to itself or the temperature surrounding the display medium, or if it is being held by a reader, it becomes possible to provide the reader with a variety of services by using the determination.

The present invention has been made with a view to addressing the problem discussed above, and provides a technique, for a display medium or electronic paper, of recognizing an environmental condition such as temperature, pressure, light, or acceleration surrounding the display medium.

SUMMARY OF THE INVENTION

To address the problems discussed above, the present invention provides a sheet with plural wireless measuring units, each of which, when a radio signal is sent, measures physical quantity surrounding itself by using the radio signal as an energy source, and generates and sends a radio signal having an attribute reflecting the measured physical quantity.

According to an embodiment of the present invention, it becomes possible to recognize an environmental condition such as temperature, pressure, light, or acceleration, surrounding a display medium such as an electronic paper.

BRIEF DESCRIPTION OF THE DRAWINGS

Embodiments of the present invention will be described in detail with reference to the following figures, wherein:

FIGS. 3A and 3B are diagrams illustrating a configuration of a wireless sensor according to the first embodiment;

FIGS. 4A and 4B are diagrams illustrating a configuration of a pressure sensor according to the first embodiment;

FIG. 8 is a block diagram illustrating a configuration relating to a communication function of an image forming apparatus according to the second embodiment;

FIG. 9 is a block diagram illustrating a configuration of a management server machine according to the second embodiment;

FIG. 10 is a diagram illustrating a data configuration of an ID management table according to the second embodiment;

DETAILED DESCRIPTION OF THE INVENTION

Embodiments of the present invention will be described with reference to the drawings.

1. First Embodiment

The first embodiment of the present invention will be described with reference to drawings.

1-1. Configuration of Electronic Paper Unit

A configuration of an electronic paper unit according to the first embodiment will be described with reference to FIG. 1. The reference number 100 of FIG. 1 indicates an electronic paper unit which is of a laminated construction consisting of electronic paper 110, temperature sensor sheet 120$t$, and pressure sensor sheet 120$p$. Temperature sensor sheet 120$t$ is a sheet on which plural wireless temperature sensors are arranged, and pressure sensor sheet 120$p$ is a sheet on which plural wireless pressure sensors are arranged. A lamination construction consisting of electronic paper 110, temperature sensor sheet 120$t$, and pressure sensor sheet 120$p$ is held by its edges by a pair of brackets 130. Bracket 130, when an edge of a lamination construction consisting of electronic paper 110, temperature sensor sheet 120$t$, and pressure sensor sheet 120$p$ is inserted into its ditch, holds the edge of the lamination construction by its sidewalls. Bracket 130 is detachable from a lamination construction consisting of electronic paper 110, temperature sensor sheet 120$t$, and pressure sensor sheet 120$p$, and by detaching brackets 130 from the lamination construction, temperature sensor sheet 120$t$ and pressure sensor sheet 120$p$ can be removed from electronic paper 110.

Electronic paper 110 is a sheet-like display medium which is able to maintain an image with no power supply. Electronic paper 110 is of a laminated construction consisting of a photo-conductive layer made of an organic photo-conducting material which is used in a copier, and a liquid crystal layer made of a liquid crystal display material (both layers not shown). When electronic paper 110 is irradiated while voltage is applied to a pair of transparent electrodes of electronic paper 110, a difference in intensity of light is converted to reflection density momentarily, and an image is stored and displayed on electronic paper 110.

Figure 1:
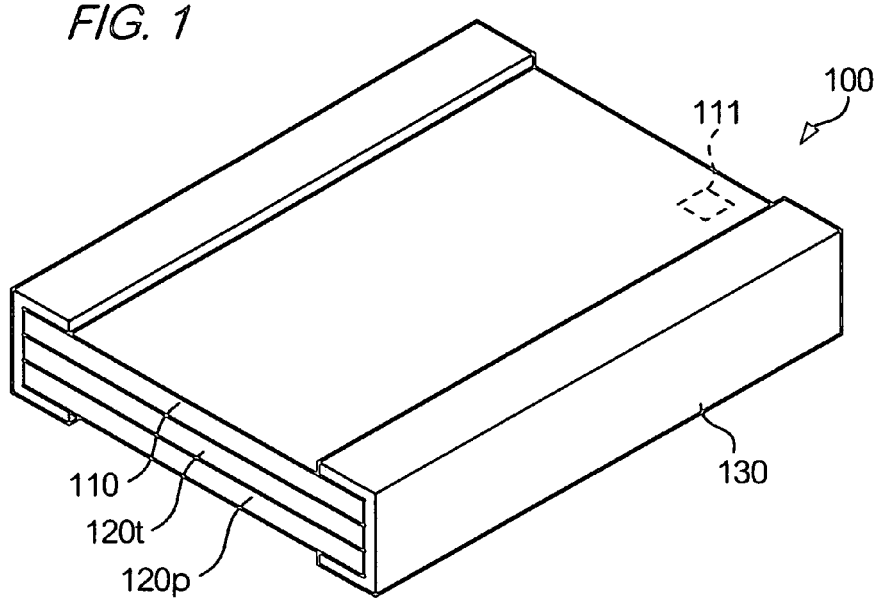
FIG. 1 is a diagram illustrating a configuration of an electronic paper unit according to a first embodiment of the present invention.

The reference number 111 of FIG. 1 indicates an RFID (Radio Frequency Identification) tag which is attached to electronic paper 110 and for identifying electronic paper 110. RFID tag 111 stores an electronic paper ID, and by identifying the electronic paper ID, electronic paper 110 can be identified.

Now, configurations of temperature sensor sheet 120$t$ and pressure sensor sheet 120$p$ will be described with reference to FIGS. 2A and 2B.

Figure 2A:
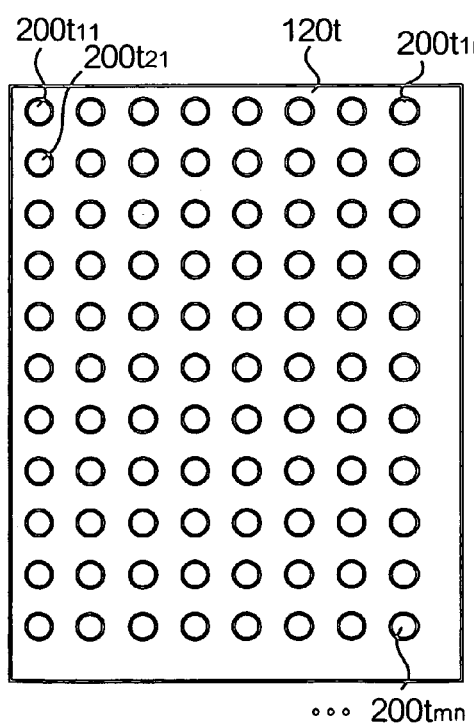
FIGS. 2A and 2B are diagrams illustrating configurations of a temperature sensor sheet and a pressure sensor sheet according to the first embodiment.

As shown in FIG. 2A, in temperature sensor sheet 120$t$, m×n pieces of wireless temperature sensors 200$t_{11}$ to 200$t_{mn}$ are arranged uniformly on a sheet. Since temperature sensor sheet 120$t$ is in a sheet-like form, it can be laid on electronic paper 110, and the laminated electronic paper 110 can be treated as paper by a reader.

Figure 2B:
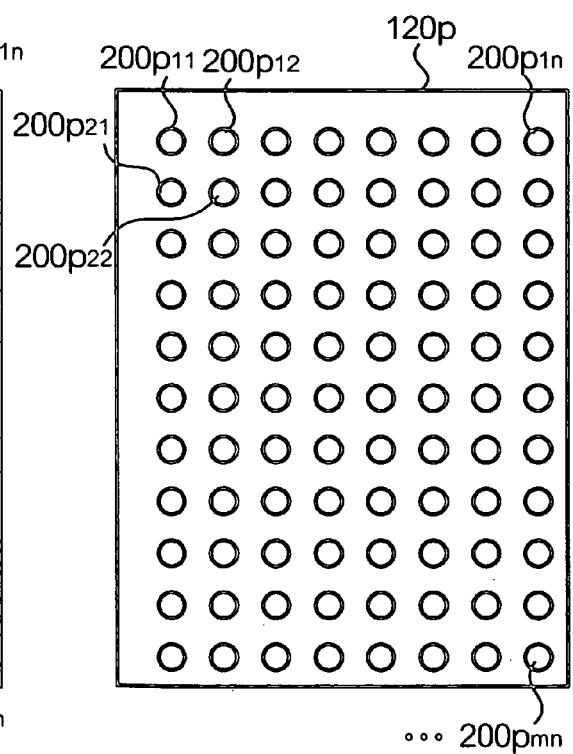

As shown in FIG. 2B, in temperature sensor sheet 120$p$, m×n pieces of wireless pressure sensors 200$p_{11}$ to 200$p_{mn}$ are arranged evenly over the entire surface of a sheet. Since temperature sensor sheet 120$p$ is in a sheet-like form as in temperature sensor sheet 120$t$, it can be laid on electronic paper 110, and the laminated electronic paper 110 can be treated as paper by a reader.

Temperature sensors 200$t_{11}$ to 200$t_{mn}$ are wireless sensors which measure the temperature of electronic paper 110, and pressure sensors 200$p_{11}$ to 200$p_{mn}$ are wireless sensors which measure the pressure applied to electronic paper 110. Temperature sensors 200$t_{11}$ to 200$t_{mn}$ and pressure sensors 200$p_{11}$ to 200$p_{mn}$, when receiving a predetermined radio signal, sends as a response to the received radio signal, a radio signal indicating a measured temperature or pressure. The configurations of the wireless sensors will be described later. Temperature sensor sheet 120$t$ with temperature sensors 200$t_{11}$ to 200$t_{mn}$ and pressure sensor sheet 120$t$ with pressure sensors 200$p_{11}$ to 200$p_{mn}$, by being laid on electronic paper 110, can measure the surface temperature of electronic paper 110 or the pressure applied to electronic paper 110.

The frequency of a radio signal of temperature sensors 200$t_{11}$ to 200$t_{mn}$ and pressure sensors 200$p_{11}$ to 200$p_{mn}$ is different from one sheet to another. Accordingly, by identifying the frequency of a radio signal sent from wireless sensors, temperature sensor sheet 120$t$ and pressure sensor sheet 120$p$ can be identified.

As shown in FIGS. 2A and 2B, temperature sensors 200$t_{11}$ to 200$t_{mn}$ and pressure sensors 200$p_{11}$ to 200$p_{mn}$ are arranged on each sheet so that they do not overlap with each other when temperature sensor sheet 120$t$ is laid on pressure sensor sheet 120$p$. For example, temperature sensor 200$t_{11}$, as shown in the drawings, is arranged so that it does not overlap with 200$t_{11}$, 200$t_{12}$, 200$t_{21}$, and 200$t_{22}$. This is because, if the sensors are too close to each other, mutual interference between the sensors occurs and thereby the frequencies of the sensors change.

In the following explanation, for convenience of explanation, temperature sensors 200$t_{11}$ to 200$t_{mn}$ are referred to as "temperature sensor 200$t$" except where it is necessary to specify otherwise. Similarly, pressure sensors 200$p_{11}$ to 200$p_{mn}$ are referred to as "pressure sensor 200$p$" except where it is necessary to specify otherwise. Also, temperature sensor 200$t$ and pressure sensor 200$p$ are referred to as "wireless sensor 200" except where it is necessary to specify otherwise.

Also, temperature sensor sheet 120$t$ and pressure sensor sheet 120$p$ are referred to as "sensor sheet 120" except where it is necessary to specify otherwise.

As described above, since sensor sheet 120 with wireless sensors 200 is laid on electronic paper 110 and used, sensor sheet 120 is able to recognize environmental conditions (physical quantities) surrounding electronic paper 110, and it is possible to perform a variety of controls on electronic paper 110 by using the measurements.

Also, since wireless sensors 200 are arranged evenly over the entire surface of a sheet, environmental conditions of the entire surface of electronic paper 110 such as a temperature and a pressure can be recognized. Also, since detecting points are arranged in a high density state, sensor sheet 120 is capable of high-accuracy detection.

Also, since sensor sheet 120 laid on electronic paper 110 is in a sheet-like form, a reader of electronic paper 110, without being aware that sensor sheet 120 is attached to electronic paper 110, can treat it like a sheet of paper.

Also, since a sensor function is provided not to electronic paper 110 but to sensor sheet 120 separated from electronic paper, by attaching sensor sheet 120, environmental conditions surrounding existing electronic paper 110 can be recognized. Also, since sensor sheet 120 is detachable from electronic paper 110, used sensor sheet 120 can be reused by being detached from electronic paper 110.

1-2. Configuration of Wireless Sensor 200

Now, a configuration and an operation of wireless sensor 200 according to the first embodiment will be described.

First, a basic configuration of wireless sensor 200 will be described, second, a configuration of temperature sensor 200t will be described, and third, a configuration of pressure sensor 200p will be described.

1-2-1. Basic Configuration of Wireless Sensor 200

FIGS. 3A and 3B are diagrams illustrating a configuration of wireless sensor 200 according to the first embodiment.

Wireless sensor 200 includes: board 1 which is a base; dielectric film 2 which is formed on board 1 and on which a surface acoustic wave propagates; a pair of inter-digital transducers 3A and 3B which are formed on dielectric film 2 and convert an electrical signal to a surface acoustic wave, or vice versa; antennas 4A and 4B which are connected to an end of inter-digital transducers 3A and 3B via impedance matching units 5A and 5B respectively, and exchanges a radio signal with an external transmitter/receiver; grounds 6A and 6B which are connected to another end of inter-digital transducers 3A and 3B, respectively; and ground electrode 7 which is formed on the underside surface of board 1 and connected with grounds 6A and 6B via through holes.

The frequency of a surface acoustic wave of wireless sensor 200 depends on the shapes of inter-digital transducers 3A and 3B and impedance matching units 5A and 5B.

Inter-digital transducers 3A and 3B, antennas 4A and 4B, impedance matching units 5A and 5B, and grounds 6A and 6B are formed integrally as a conductive pattern. A material of the conductive pattern may be a metal such as Ti, Cr, Cu, W, Ni, Ta, Ga, In, Al, Pd, Pt, Au, and Ag, and an alloy such as Ti—Al, Al—Cu, Ti—N, and Ni—Cr. In the metals, especially Au, Ti, W, Al, and Cu are preferable. The conductive pattern may consist of a single layer or multilayer structure of the metal or alloy. The thickness of the metal layer preferably ranges from 1 nanometer to under 10 micrometers.

1-2-2. Configuration of Temperature Sensor 200t

To use wireless sensor 200 discussed above as temperature sensor 200t, $LiNbO_3$ is used as a material of dielectric film 2 of FIG. 3. In a crystal of $LiNbO_3$, the propagation velocity of its surface acoustic wave is responsive to a temperature change, and a change of the propagation velocity due to a temperature change causes the frequency of a surface acoustic wave to change. The temperature coefficient is approximately $75 \times 10^{-6}$ per degree. An experiment shows, as an example, that when the temperature of a crystal of $LiNbO_3$ changes by 100 degrees, the frequency of a surface acoustic wave changes from center frequency f0 by 0.2% to 0.3%.

Inter-digital transducers 3A and 3B, antennas 4A and 4B, and impedance matching units 5A and 5B generate a mechanical vibration of the same center frequency f0 as that of a radio signal sent from outside, and the strength of a radio signal received by an external receiver from temperature sensor 200t is altered by the change of a frequency caused on dielectric film 2 of temperature sensor 200t. The strength of the radio signal received by the external receiver changes linearly in response to a temperature change.

1-2-3. Configuration of Pressure Sensor 200p

FIGS. 4A and 4B are diagrams illustrating a configuration of pressure sensor 200p according to the first embodiment.

Pressure sensor 200p includes: Si board 21 which is a base; dielectric film 22 which is formed on Si board 21 via oxide film 21A and on which a surface acoustic wave is propagated; a pair of inter-digital transducers 23A and 23B which are formed on dielectric film 22 and convert an electrical signal to a surface acoustic wave, or vice versa; antennas 24A and 24B which are connected to an end of inter-digital transducers 23A and 23B via impedance matching units 25A and 25B respectively, and exchanges a radio signal with an external transmitter/receiver; grounds 26A and 26B which are connected to another end of inter-digital transducers 23A and 23B, respectively; ground electrode 27 which is formed on the underside surface of Si board 21 and connected with grounds 26A and 26B via through holes; and pressure receiver 8. Pressure receiver 8 is provided on dielectric film 22 so that it projects upward from pressure sensor 200p. When external pressure is applied to the tip of pressure receiver 8, dielectric film 22 is warped and thereby the frequency of a surface acoustic wave which propagates on dielectric film 22 is altered.

On the underside surface of Si board 21, a concave having a tapered inner side surface with 54.75 degrees is formed by anisotropic etching, the bottom of which is diaphragm 21B susceptible to external pressure. Oxide film 21A is rendered a little thicker in the drawing, but in fact how thick oxide film 21A is does not matter as long as it can provide insulation between Si board 21 and dielectric film 22.

To use wireless sensor 200 discussed above as pressure sensor 200p, $LiTaO_3$ is used as a material of dielectric film 2 of FIG. 4. In a crystal of $LiTaO_3$, the propagation velocity of its surface acoustic wave is responsive to a pressure change. The temperature coefficient of a crystal of $LiTaO_3$ is approximately $18.0 \times 10^{-6}$ per degree, which is one fourth that of $LiNbO_3$, and when the temperature of a crystal of $LiTaO_3$ changes by 10° C., the frequency of a surface acoustic wave changes by 0.005 percent. Therefore, according to pressure sensor 200p made of $LiTaO_3$, a pressure change is detected without being affected by the change of surrounding temperature.

Since dielectric film 22 is laid on diaphragm 21B via oxide film 21A, if external pressure of 2 bars is applied to diaphragm 21B, a warp of diaphragm 21B causes the distance between inter-digital transducers 23A and 23B on dielectric film 22 to change, and thereby the velocity of a surface acoustic wave is altered. Consequently, the frequency of the surface acoustic wave changes from center frequency f0 by 0.2 percent. If the temperature change of a measuring object is significant, the frequency of a surface acoustic wave may be corrected by using temperature sensor 200t in combination.

Inter-digital transducers 23A and 23B, antennas 24A and 24B, and impedance matching units 25A and 25B generate a mechanical vibration of the same center frequency f0 as that of a radio signal sent from outside, and the strength of a radio signal received by an external receiver from pressure sensor 200p is altered by the change of a frequency caused on dielectric film 22 of pressure sensor 200p. The strength of the radio signal received by the external receiver changes linearly in response to a pressure change.

In pressure sensor 200p discussed above, a concave is formed on Si board 21, the bottom of which is used as diaphragm 21B. However, oxide film 21A may be used as a diaphragm. In summary, as long as an external pressure affects dielectric film 22 directly or indirectly, the configuration of diaphragm 21B does not matter.

1-2-4. Basic Operation of Wireless Sensor 200

Now, a basic measurement operation of wireless sensor 200 will be described with reference to FIGS. 3A and 3B.

For clarity of explanation, it is assumed in the following description that a signal in FIG. 3A travels from antenna 4A to antenna 4B. However, the signal may travel from antenna 4B to antenna 4A.

Wireless sensor 200 exchanges a radio signal with an external transmitter or receiver. A radio signal sent from the external transmitter is received by antenna 4A, and inter-digital transducer 3A, in response to the radio signal, excites dielectric film 2 to generate a mechanical vibration. The mechanical vibration causes a surface acoustic wave on dielectric film 2. The surface acoustic wave is propagated from inter-digital transducer 3A toward inter-digital transducer 3B, during which the surface acoustic wave varies in response to a change in physical quantity (in this embodiment, temperature and pressure) affecting dielectric film 2 in terms of the attributes of the surface acoustic wave such as amplitude, phase difference, and frequency, etc. The surface acoustic wave which has reached inter-digital transducer 3B is converted by inter-digital transducer 3B to an electrical signal and sent via antenna 4B. The radio signal sent from wireless sensor 200 is received by the external receiver.

The radio signal received by the external receiver is converted to an electrical signal and analyzed, and consequently the physical quantity recognized by wireless sensor 200 is calculated.

1-2-5. Support for Plural Wireless Sensors

In the foregoing sections 1-2-1 to 1-2-4, a wireless sensor tunable for a single frequency is described. Now, a wireless sensor tunable for plural frequencies will be described.

Figure 5:
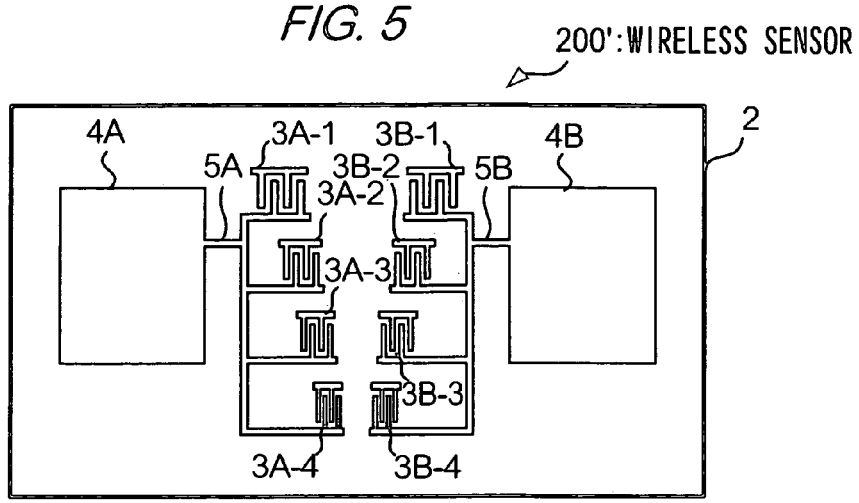
FIG. 5 is a diagram illustrating another configuration of a wireless sensor according to the first embodiment.

As shown in FIG. 5, in wireless sensor 200', inter-digital transducers 3A-1 to 3A-4 and 3B-1 to 3B-4 are provided, which are different to each other in shape. In wireless sensor 200', surface acoustic waves corresponding to plural frequencies for which inter-digital transducers 3A-1 to 3A-4 and 3B-1 to 3B-4 can be tuned are generated on dielectric film 2.

For example, it is assumed that inter-digital transducers 3A-1 and 3B-1 and impedance matching units 5A and 5B are tunable for frequency f1, inter-digital transducers 3A-2 and 3B-2 and impedance matching units 5A and 5B are tunable for frequency f2, inter-digital transducers 3A-3 and 3B-3 and impedance matching units 5A and 5B are tunable for frequency f3, and inter-digital transducers 3A-4 and 3B-4 and impedance matching units 5A and 5B are tunable for frequency f4.

Please note that in FIG. 5, diagrammatic representations of grounds and a ground electrode are omitted.

If a radio signal having frequency f1 is sent from an external transmitter, inter-digital transducer 3A-1 generates a mechanical vibration, which causes a surface acoustic wave on dielectric film 2. The surface acoustic wave is propagated to inter-digital transducer 3B-1, during which the attribute of the surface acoustic wave changes under the influence of the surroundings.

On the other hand, in the other inter-digital transducers 3A-2 to 3A-4 and 3B-2 to 3B-4, generation of a surface acoustic wave and subsequent transmission of a radio signal are not performed, because they are not tuned for frequency f1.

If a radio signal having frequency f2 is sent to wireless sensor 200', a surface acoustic wave is propagated from inter-digital transducer 3A-2 to inter-digital transducer 3B-2, and a radio signal corresponding to the surface acoustic wave is sent via antenna 4B.

If a radio signal having frequency f3 is sent to wireless sensor 200', a surface acoustic wave is propagated from inter-digital transducer 3A-3 to inter-digital transducer 3B-3, and a radio signal corresponding to the surface acoustic wave is sent via antenna 4B.

If a radio signal having frequency f4 is sent to wireless sensor 200', a surface acoustic wave is propagated from inter-digital transducer 3A-4 to inter-digital transducer 3B-4, and a radio signal corresponding to the surface acoustic wave is sent via antenna 4B.

Accordingly, if four radio signals which have frequencies f1, f2, f3, and f4 respectively are sent to wireless sensor 200' in a certain order, an external receiver receives signals corresponding to the frequencies in that order.

In this case, if the variation widths (the width of a change due to a environmental condition) of the frequencies of radio signals sent from inter-digital transducers 3B-1 to 3B-4 (output side) are set so that they do not overlap with each other, even if the four radio signals having frequencies f1 to f4 respectively are sent to wireless sensor 200' simultaneously, the four signals received in response can be separated and analyzed.

For example, it is assumed that four wireless sensors 200-1 to 200-4 are attached to four measuring objects, respectively. Specifically, in wireless sensor 200-1, inter-digital transducers 3A-1 and 3B-1 of wireless sensor 200' (see FIG. 5) are formed; in wireless sensor 200-2, inter-digital transducers 3A-2 and 3B-2 of wireless sensor 200' are formed; in wireless sensor 200-3, inter-digital transducers 3A-3 and 3B-3 of wireless sensor 200' are formed; and in wireless sensor 200-4, inter-digital transducers 3A-4 and 3B-4 are formed. Accordingly, the frequency of a surface acoustic wave generated on dielectric film 2 of each wireless sensor is f1, f2, f3, and f4, respectively. Accordingly, on the basis of the frequency of a received radio signal, it can be determined as to which of the wireless sensors 200-1 to 200-4 is the source of the radio signal.

Accordingly, if a radio signal having frequency f1 is sent, a measurement is performed by wireless sensor 200-1; if a radio signal having frequency f2 is sent, a measurement is performed by wireless sensor 200-2; if a radio signal having frequency f3 is sent, a measurement is performed by wireless sensor 200-3; and if a radio signal having frequency f4 is sent, a measurement is performed by wireless sensor 200-4.

2. Second Embodiment

Now, an apparatus which forms electronic paper unit 100 according to the first embodiment, and a system which manages electronic paper unit 100 will be described. The apparatus is, specifically, an apparatus which forms electronic paper unit 100 by attaching sensor sheet 120 to electronic paper 110, and the system is a system which manages identification data of electronic paper 110 and identification data of sensor sheet 120.

A configuration of electronic paper unit 110 according to the present embodiment is the same as that of electronic paper 110 according to the first embodiment. Accordingly, an explanation of electronic paper unit 110 and its components is omitted, and the same reference numbers as those of the first embodiment will be used below.

2-1. Configuration

2-1-1. System Configuration

A configuration of a system according to the second embodiment of the present invention will be described with reference to FIG. 6.

In the drawing, the reference sign 300 indicates a network such as a LAN (Local Area Network) and the Internet. To network 300, image forming apparatus 400 and client machines 500a and 500b, and management server machine 600 are connected. The unit and machines communicate data with each other via network 300.

Figure 6:
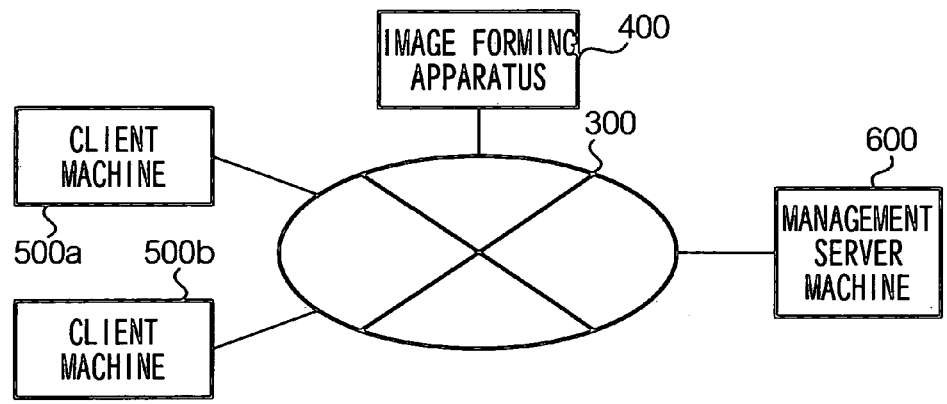
FIG. 6 is a diagram illustrating a configuration of a system according to a second embodiment of the present invention.

In FIG. 6, for simplicity of the drawing, one or two units and machines are shown, but in fact there may exist many more units and machines.

Client machines 500a and 500b are communication apparatuses such as a personal computer, and each of them includes; a controller consisting of a CPU (Central Processing Unit), a ROM (Read Only Memory), and a RAM (Random Access Memory), etc.; a storage unit such as a HDD (Hard Disk Drive); a communication unit such as a modem; a display such as a liquid crystal display; and an operation unit such as a keyboard and a mouse. Each controller of client machines 500a and 500b sends data for image formation such as document data and image data to image forming apparatus 400 via the communication unit.

Image forming apparatus 400 is an apparatus which performs an image formation on electronic paper 110. In image forming apparatus 400, electronic papers 110 and sensor sheets 120 are housed. Image forming apparatus 400 forms an image on electronic paper 110, attaches sensor sheet 120 to the electronic paper automatically, and outputs it as electronic paper unit 100.

2-1-2. Configuration of Image Forming Apparatus 400

Now, a configuration of image forming apparatus 400 will be described with reference to FIGS. 7 and 8. In the following explanation, first, a configuration of image forming apparatus 400 relating to an image forming process will be described with reference to FIG. 7, and second, a configuration of image forming apparatus 400 relating to its control and communication function will be described with reference to FIG. 8.

Figure 7:
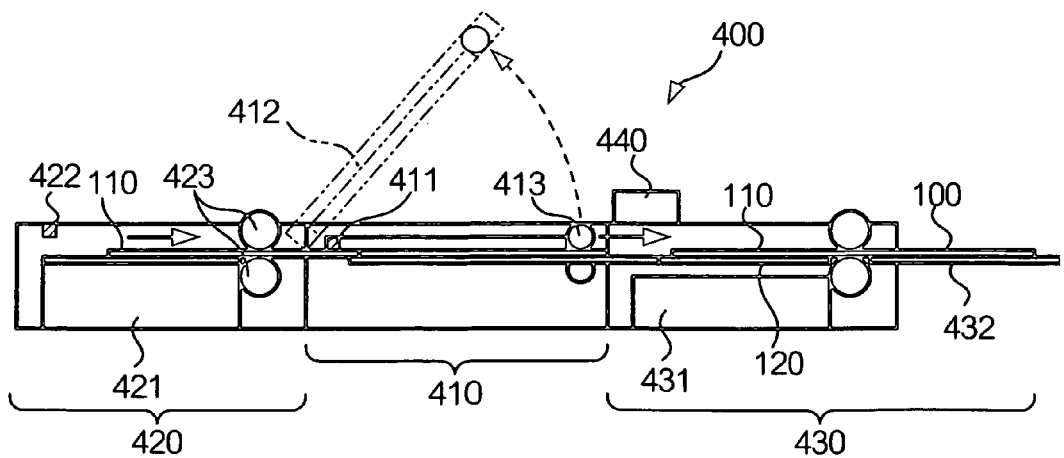
FIG. 7 is a diagram illustrating a configuration of an image forming apparatus according to the second embodiment.

FIG. 7 is a diagram illustrating an example of a configuration of image forming apparatus 400. In the drawing, the reference number 440 indicates a user interface by which a user operates image forming apparatus 400. User interface 440 has a liquid crystal display which is a touch screen, and a user performs an operation by touching on the liquid crystal display.

The reference number 410 indicates an image forming unit which performs an image formation process on electronic paper 110 on the basis of document data or image data received from client machines 500a and 500b. Image forming unit 410 includes: voltage applying electrode 411 which applies voltage to transparent electrodes of electronic paper 110; print head 412 composed of a photo-chromatic element for image writing; feed rollers 413 which feed electronic paper 110. Image forming unit 410 applies voltage to electronic paper 110 by voltage applying electrode 411 and irradiates light on the paper by print head 412. Consequently, in electronic paper 110, a difference in intensity of the light is converted to reflection density momentarily, and an image is stored and displayed. The image formed electronic paper 110 is fed by feed rollers 413 to sensor sheet attaching unit which is described later.

The reference number 420 indicates an electronic paper feeder which feeds electronic paper 110 to image forming unit 410. Electronic paper feeder 420 includes: electronic paper tray 421 which houses a stack of electronic papers 110; tag reader 422 which reads electronic paper ID stored in RFID tag attached to electronic paper 110; and loading rollers which feeds electronic paper 110. Electronic paper 110 fed from electronic paper tray 421 is fed by loading rollers 423 to image forming unit 410.

Tag reader 422 is arranged so that it faces RFID tag 111 attached to electronic paper 110 fed from electronic paper tray 421, and makes a contact with RFID tag 111 and reads electronic paper ID stored therein.

The reference number 430 indicates a sensor sheet attaching unit which attaches sensor sheet 120 to electronic paper 110 fed from image forming unit 410. Sensor sheet attaching unit 430 includes: sensor sheet tray 431 which houses a stack of sensor sheets 431; and output tray 432 onto which electronic paper unit 100 is output. Electronic paper 110 on which an image has been formed in image forming unit 410 is fed by feed rollers 413 to sensor sheet attaching unit 430. Sensor sheet attaching unit 430 attaches two sensor sheets 120 to electronic paper 110 fed from image forming unit 410 and clips the edges of the sensor sheets with a bracket, thereby forming electronic paper unit 100, and outputs it onto output tray 432.

Sensor sheet tray 431 may house, in addition to temperature sensor sheet 120t and pressure sensor sheet 120p discussed in the first embodiment, a variety of sensor sheets 120 such as a humidity sensor sheet in which plural wireless humidity sensors are arranged and a light sensor sheet in which plural wireless light sensors are arranged. Each configuration of a humidity sensor sheet and a light sensor sheet is the same as that of temperature sensor sheet 120t and pressure sensor sheet 120p discussed in the first embodiment except that the type of wireless sensors arranged in each sensor sheet is different. Accordingly, an explanation of the configurations of a humidity sensor sheet and a light sensor sheet will be omitted.

Configurations of wireless humidity sensors and light sensors will be described later.

A user of client machine 500a or 500b, when sending data for image formation such as document data and image data to image forming apparatus 400, uses its operation unit and selects two types of sensor sheets (e.g. temperature sensor sheet 120t and pressure sensor sheet 120p). The selection is made by inputting a letter or a symbol or selecting a displayed icon. Client machine 500a or 500b sends sheet type data indicating the selected types of sensor sheets 120 to image forming apparatus 400 together with the data for image formation. Image forming apparatus 400, when receiving the data for image formation and the sheet type data, forms an image on electronic paper 110 on the basis of the data for image formation, and selects two types of sensor sheets 120 on the basis of the sheet type data and attaches them to electronic paper 110, thereby forming electronic paper unit 100.

Now, a configuration of image forming apparatus 400 relating to its control and communication function will be described with reference to FIG. 8.

FIG. 8 is a block diagram illustrating a configuration of image forming apparatus 400 relating to its communication function. In the drawing, the reference number 450 indicates a controller which is a microcomputer consisting of a processor such as CPU, a ROM, a RAM (each of which is not shown), etc. The reference number 480 indicates a nonvolatile storage unit which is a mass storage device such as a hard disk. The processor of controller 450 reads and executes a computer program stored in the ROM or the storage unit 480 and thereby controls components of image forming apparatus 400. Storage unit 480 stores a table (or a calculation formula) for converting the amount of the change of a frequency to a value indicating an environmental condition. Controller 450 converts, on the basis of the table, the change of the frequency of a radio signal received from wireless sensor 200 to a value indicating an environmental condition.

Storage unit 480 also stores data-for-image-formation management database DB. Controller 450 of image forming apparatus 400, when forming an image on electronic paper 110 and forming electronic paper unit 100, generates data ID identifying data for image formation. The generated data ID and the data for the image formation are stored by controller 450 in association with each other in data-for-image-formation management database DB.

The reference number 460 indicates a communication unit consisting of a modem and a variety of communication devices, which under the control of controller 450, communicates data with client machine 500a or 500b, or management server machine 600 via network 300.

Reference number 470 indicates a wireless communication unit with an antenna which sends a radio signal to wireless sensor 200 (in FIG. 8, wireless sensors 200-1 to 200-4) and receives a radio signal from wireless sensor 200. As described above, since the frequency of a radio signal of wireless sensors 200 arranged on sensor sheet 120 is different from one sheet to another, controller 450 of image forming apparatus 400 can identify sensor sheet 120 on the basis of the frequency of a radio signal received via wireless communication unit 470. Specifically, controller 450 identifies sensor ID on the basis of the frequency of a received radio signal, and identifies sensor sheet 120 on the basis of the sensor ID.

In FIG. 8, for simplicity of the drawing, only four wireless sensors 200-1 to 200-4 are depicted, but the number of wireless sensors may be less than or greater than four.

Controller 450 of image forming apparatus 400, when forming an image on electronic paper 110 and forming electronic paper unit 100, sends electronic paper ID read by tag reader 422, sensor sheet ID, and data ID identifying data for the image formation to management server machine 600 via communication unit 460.

2-1-3. Configuration of Management Server Machine

Now, a configuration of a management server machine will be described with reference to FIG. 9.

In the drawing, the reference number 610 indicates a controller consisting of a processor such as a CPU, a ROM, a RAM (each of which is not shown), etc. The reference number 620 indicates a nonvolatile storage unit which is a mass storage device such as a hard disk. The processor of controller 610 reads and executes a program stored in the ROM or storage unit 620, and thereby controls components of management server machine 600. The reference number 630 indicates a communication unit consisting of a modem and a variety of communication devices, which under the control of controller 610, performs data communication via network 300.

Storage unit 620 of management server machine 600 stores ID management table TBL which is for storing electronic paper ID, sensor sheet ID, and data ID. Controller 610 of management server machine 600, when receiving electronic paper ID, sensor sheet ID, and data ID from image forming apparatus 400, stores the received IDs in association with each other in ID management table TBL.

FIG. 10 is a diagram illustrating a data configuration of ID management table TBL. As shown in the drawing, in ID management table TBL, items "Electronic Paper ID", "Sensor Sheet ID 1", "Sensor Sheet ID 2", and "Data ID" are associated with each other. The table is used for managing electronic paper 110 and sensor sheets 120 which form electronic paper unit 100, and document data or image data stored in electronic paper 110.

Item "Electronic Paper ID" of ID management table TBL is data stored in RFID tag 111 attached to electronic paper 110 and identifies electronic paper 110. Item "Data ID" is data for identifying data of a document or image written on electronic paper 110. Items "Sensor Sheet ID 1" and "Sensor Sheet ID 2" are data for identifying sensor sheet 120, and are identified on the basis of the frequency of a radio signal sent from wireless sensors 200 of sensor sheet 120.

Electronic paper unit 100 according to the present embodiment is formed by combination of one electronic paper 110 and two sensor sheets 120. Accordingly, item "Sensor Sheet ID 1" indicates sensor sheet ID of the first sensor sheet 120, and item "Sensor Sheet ID 2" indicates sensor sheet ID of the second sensor sheet 120.

2-2. Operation Example

An operation example according to the present embodiment will be described. In the operation example, it is assumed that temperature sensor sheet 120t and pressure sensor sheet 120p are selected as a sensor sheet attached to electronic paper 110.

2-2-1. Operation of Client Machine 500a

When a user inputs or selects data for image formation, sheet type data indicating temperature sensor sheet 120t, and sheet type data indicating pressure sensor sheet 120p by using an operation unit of machine 500a, client machine 500a sends the data for image formation and the sheet type data to image forming apparatus 400 via its communication unit.

2-2-2. Operation of Image Forming Apparatus 400

Figure 11:
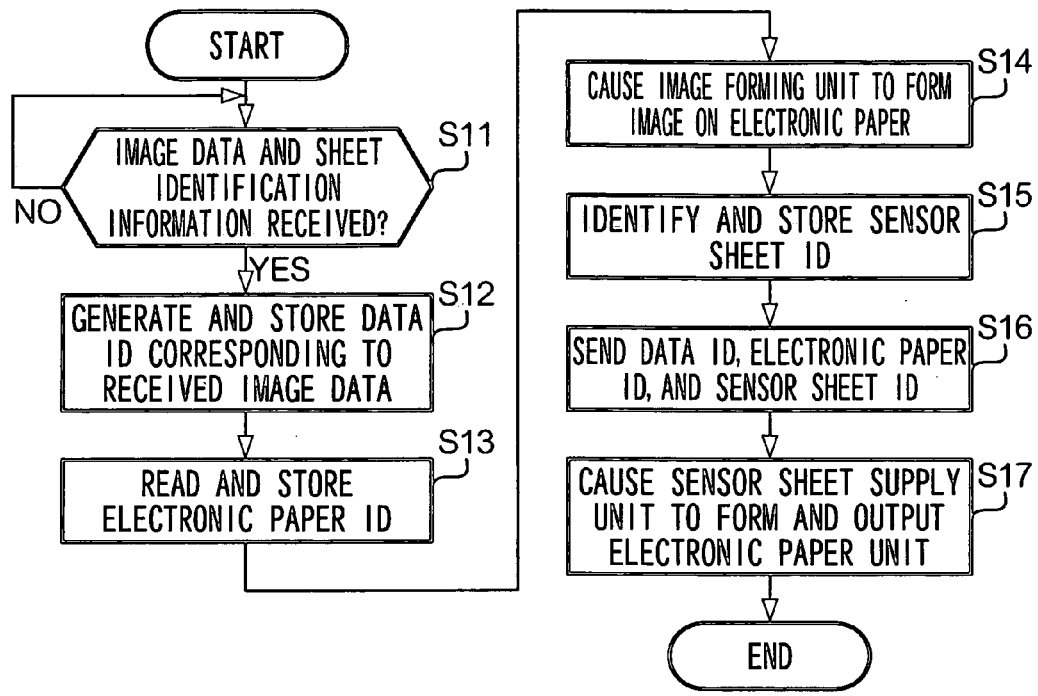
FIG. 11 is a flowchart illustrating an operation of a controller of an image forming apparatus according to the second embodiment.

Now, an operation of image forming apparatus 400 will be described with reference to FIG. 11. FIG. 11 is a flowchart illustrating an operation of controller 450 of image forming apparatus 400.

Controller 450 of image forming apparatus 400, when receiving data for image formation and sheet type data via communication unit 460 (Step S11; YES), generates data ID for the received data for image formation and stores it in memory of controller 450 (Step S12). Subsequently, controller 450 causes loading roller 423 to feed electronic paper 110 from electronic paper feeder 420 to image forming unit 410. In doing so, controller 450 causes tag reader 422 to read electronic paper ID stored in RFID tag 111 attached to the fed electronic paper 110, and stores the read electronic paper ID in the memory of controller 450 (Step S13).

When electronic paper 110 is fed to image forming unit 410, image forming unit 410 forms an image on electronic paper 110 on the basis of the received data for image formation (Step S14), and feeds the image formed electronic paper 110 to sensor sheet attaching unit 430.

When electronic paper 110 is fed to sensor sheet attaching unit 430, controller 450 selects on the basis of the sheet type data received from client machine 500a, sensor sheets 120 to be fed from sensor sheet tray 431. In the operation example, since the sheet type data indicates temperature sensor sheet 120t and pressure sensor sheet 120p, controller 450 causes sensor sheet tray 431 to feed temperature sensor sheet 120t and pressure sensor sheet 120p.

At the same time, controller 450 receives radio signals from temperature sensors 200t of temperature sensor sheet 120*t* and pressure sensors 200*p* of pressure sensor sheet 120*p*, identifies each sensor sheet ID on the basis of the frequencies of the received radio signals, and stores the identified two sensor sheet IDs in the memory of controller 450 (Step S15).

Subsequently, controller 450 reads from the data ID, the electronic paper ID, and two sensor sheet IDs, and sends them to management server machine 600 via communication unit 460 (Step S16).

Sensor sheet attaching unit 430 attaches under the control of controller 450, temperature sensor sheet 120*t* and pressure sensor sheet 120*p* to the electronic paper 110 which has been fed from image forming unit 410, and holds its edges with brackets 130, thereby forming electronic paper unit 100. Subsequently, sensor sheet attaching unit 430 outputs the formed electronic paper unit 110 onto output tray 432 (Step S17).

Figure 12:
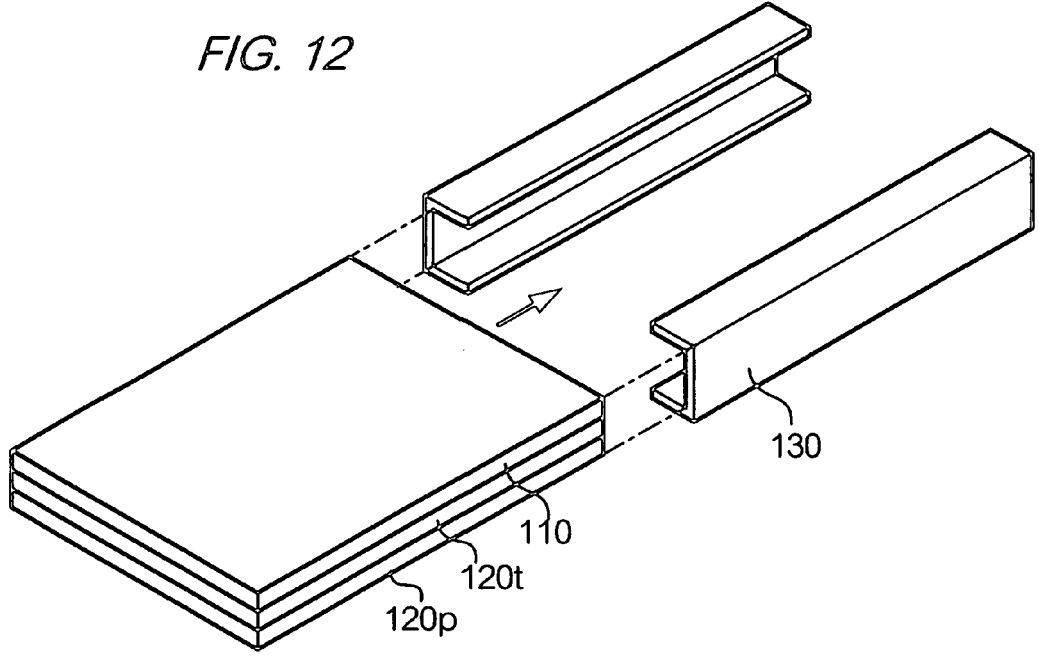
FIG. 12 is a diagram illustrating how an electronic paper unit according to the second embodiment is formed.

Below, an operation of forming electronic paper unit 100 by sensor sheet attaching unit 430 will be described with reference to FIG. 12.

First, as shown in the drawing, sensor sheet attaching unit 430 lays electronic paper 110 on temperature sensor sheet 120*t* and pressure sensor sheet 120*p*. Subsequently, sensor sheet attaching unit 430 slides the stack of sheets into a pair of brackets 130 provided from a predetermined position of sensor sheet attaching unit 430, as shown by the arrow of FIG. 12, and holds its edges with brackets 130. Thus, electronic paper unit 100 is formed.

By attaching sensor sheet 120 to electronic paper 110 as discussed above, it becomes possible to recognize an environmental condition of electronic paper 110, and to provide services by using the recognition result.

Also, since electronic paper unit 100 is formed by image forming apparatus 400 automatically, a user is saved from the labor of attaching sensor sheet 120 to electronic paper 110 manually.

In the above operation example, in addition to temperature sensor sheet 120*t* and pressure sensor sheet 120*p* or an alternative, another sensor sheet 120 with light sensors or acceleration sensors may be selected as sensor sheet 120 to be attached to electronic paper 110. A user can select and attach desired sensor sheet 120 to electronic paper 110.

2-2-3. Operation of Management Server Machine 600

Controller 610 of management server machine 600, when receiving electronic paper ID and sensor sheet IDs from image forming apparatus 400, stores the received IDs in ID management table TBL.

2-2-4. Measuring Operation with Wireless Sensor 200

Figure 13:
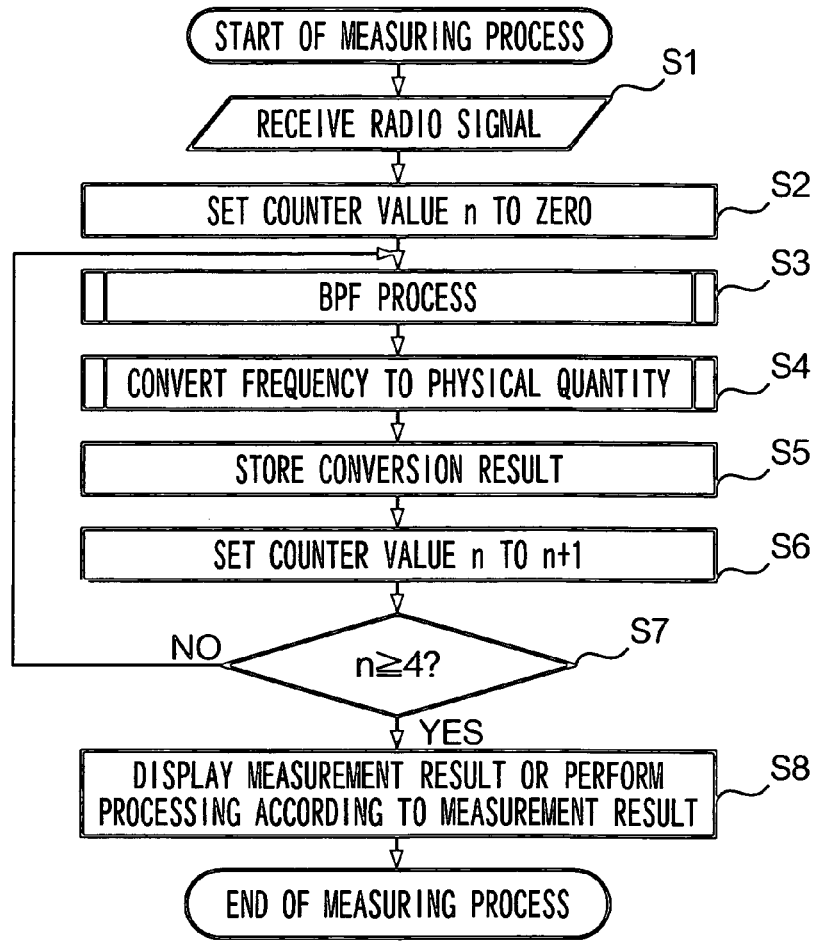
FIG. 13 is a flowchart illustrating a measuring process performed by a controller of an image forming apparatus according to the second embodiment.

Now, a measuring operation with wireless sensor 200 will be described with reference to FIGS. 8 and 13.

In the following description, image forming apparatus 400 receives a radio signal from wireless sensor 200 and recognizes an environmental condition on the basis of the radio signal, but the operation may be performed by another apparatus.

Also, in the following description, it is assumed that four wireless sensors 200-1 to 200-4 are used, but the number of wireless sensors may be more than or less than four.

In FIG. 8, in wireless sensor 200-1, inter-digital transducers 3A-1 and 3B-1 of wireless sensor 200' (see FIG. 5) are formed; in wireless sensor 200-2, inter-digital transducers 3A-2 and 3B-2 of wireless sensor 200' are formed; in wireless sensor 200-3, inter-digital transducers 3A-3 and 3B-3 of wireless sensor 200' are formed; and in wireless sensor 200-4, inter-digital transducers 3A-4 and 3B-4 are formed. Accordingly, the frequency of a surface acoustic wave generated on dielectric film 2 of each wireless sensor is f1, f2, f3, and f4, respectively. Accordingly, on the basis of the frequency of a received radio signal, it can be determined which of the wireless sensors 200-1 to 200-4 is the source of the radio signal.

Also, in the following description, it is assumed that controller 450 of image forming apparatus 400 sends radio signals which have sine waves and which have frequencies f1, f2, f3, and f4 respectively to wireless sensors 200-1 to 200-4 via wireless communication unit 470, and that each of wireless sensors 200-1 to 200-4 sends a radio signal having a frequency which has changed in response to its environmental condition to wireless communication unit 470 of image forming apparatus 400.

First, controller 450 receives radio signals wherein four frequencies are mixed from wireless sensors 200-1 to 200-4 via wireless communication unit 470 (Step S1). Controller 450 sets value n of a counter (not shown) to "0" (Step S2).

Controller 450 performs a BPF process to extract frequency f1 (Step S3), and calculates physical quantities measured by wireless sensor 200-1 on the basis of a table pre-stored in storage unit 480 (Step S4). Controller 450 subsequently stores the calculation result in its RAM (Step S5).

Controller 450 increments the counter from n to n+1 (Step S6), and determines whether the incremented value has become equal to or more than "4" (Step S7). When it is determined that the incremented value is less than "4", namely all physical quantities measured by four wireless sensors 200-1 to 200-4 have not been calculated, controller 450 repeats the operation of Step S3 and subsequent operations. When it is determined that the incremented value has reached "4", namely all physical quantities measured by four wireless sensors 200-1 to 2004 have been calculated, controller 450 proceeds to Step S8.

Controller 450 causes a monitor (not shown) to display the measurement results of wireless sensors 200-1 to 200-4 stored in the RAM, or controls measuring objects in accordance with the measurement results (Step S8).

In the above operation, for identifying each wireless sensor 200, instead of differentiating the shape and size of inter-digital transducers 3A and 3B, it is possible to differentiate the distance d (see FIG. 3) between inter-digital transducers 3A and 3B of each wireless sensor 200 and thereby differentiate the frequency of a surface acoustic wave generated on dielectric film 2.

By differentiating the distance between inter-digital transducers 3A and 3B of each wireless sensor 200, the propagation time of a surface acoustic wave generated on dielectric film 2 of each wireless sensor 200 is differentiated. Accordingly, by measuring a time from transmission of a radio signal by wireless communication unit 470 to reception of a radio signal by the same unit, each wireless sensor 200 is identified.

3. Third Embodiment

3-1. Configuration

A configuration of image forming apparatus 400' according to the third embodiment of the present invention will be described with reference to FIG. 14.

Figure 14:
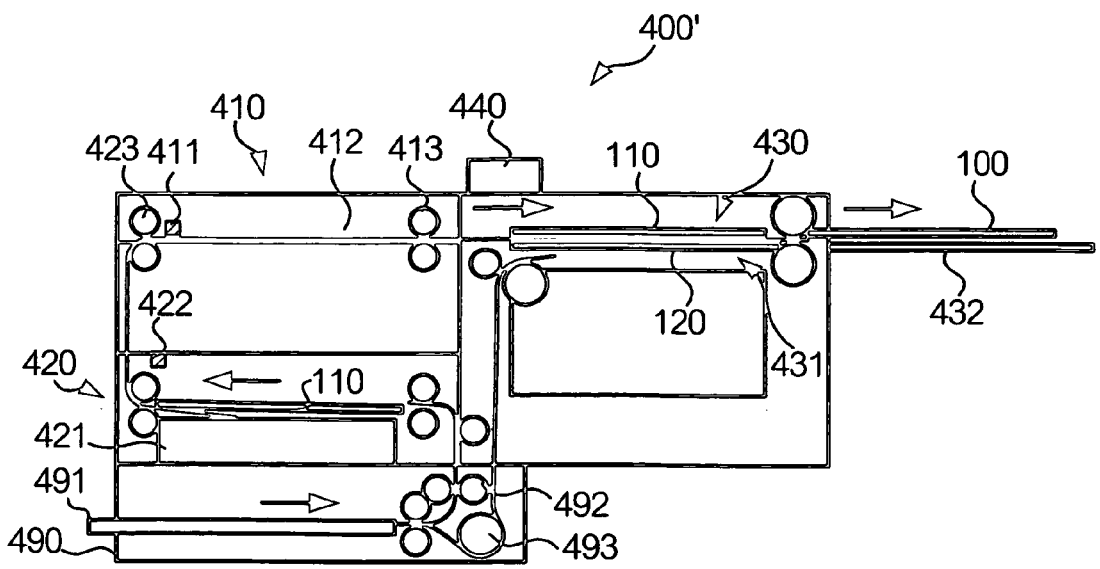
FIG. 14 is a diagram illustrating a configuration of an image forming apparatus according to a third embodiment.

FIG. 14 is a diagram illustrating a configuration of image forming apparatus 400' according to the third embodiment. The configuration and operation of image forming apparatus 400' is the same as those of image forming apparatus 400 according to the second embodiment except that image forming apparatus 400' is in addition provided with a sheet detaching unit. Accordingly, the difference from the image forming apparatus 400 will be described and the same reference numbers as those of image forming apparatus 400 will be used.

In FIG. 14, the reference number 490 indicates a sheet detaching unit which removes brackets 130 from electronic paper unit 100 and detaches sensor sheet 120 from electronic paper 110. Sheet detaching unit 490 includes: unit slot 491 into which a user inserts electronic paper unit 100; electronic paper feed rollers 492 which feeds electronic paper 110 to electronic paper tray 431; and sensor sheet feed roller 493 which feeds sensor sheet 120 to sensor sheet tray 431.

3-2. Operation

An operation of image forming apparatus 400' will be described.

Sheet detaching unit 490, when electronic paper unit 100 is inserted through unit slot 491, removes brackets 130 from electronic paper unit 100 and detaches sensor sheet 120 from electronic paper 110. Electronic paper 110 is fed by electronic paper feed rollers 492 to electronic paper tray 421, and sensor sheet 120 is fed by sensor sheet feed roller 493 to sensor sheet tray 431.

In the meanwhile, controller 450 of image forming apparatus 400' causes tag reader 422 to read the electronic paper ID of electronic paper 110, identifies the sensor sheet ID on the basis of a radio signal received from wireless sensors 200 of sensor sheet 120, and sends the electronic paper ID and the sensor sheet ID to management server machine 600 via communication unit 460.

Management server machine 600, when receiving the electronic paper ID and the sensor sheet ID, searches ID management table TBL by either of the IDs and deletes a retrieved record including the IDs from ID management table TBL.

According to the present embodiment, since sensor sheet 120 is detached from electronic paper 110, electronic paper 110 and sensor sheet 120 can be reused individually. Also, since a record of sensor sheet 120 is deleted automatically when detached from electric paper 110, management of electronic paper 110 and sensor sheet 120 is easy.

4. Modifications

The embodiments of the present invention discussed above may be modified as described below.

4-1

In the above embodiments, the number of sensor sheets attached to electronic paper 110 is not limited to two, but may be one or more than three as long as each sensor sheet 120 operates properly.

Figure 15:
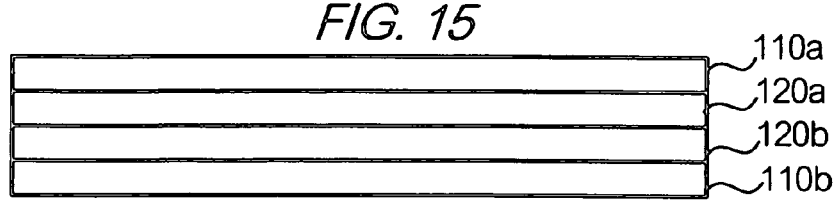
FIG. 15 is a diagram illustrating an example of a configuration of an electronic paper unit.

Similarly, the number of electronic papers 110 is not limited to one. For example, as shown in FIG. 15, electronic paper unit 100 may consist of electronic paper 110*a*, sensor sheet 120*a*, sensor sheet 120*b*, and electronic paper 110*b*, in that order, and thereby enabling both sides of electronic paper unit 100 to display an image or a document.

Figure 16:
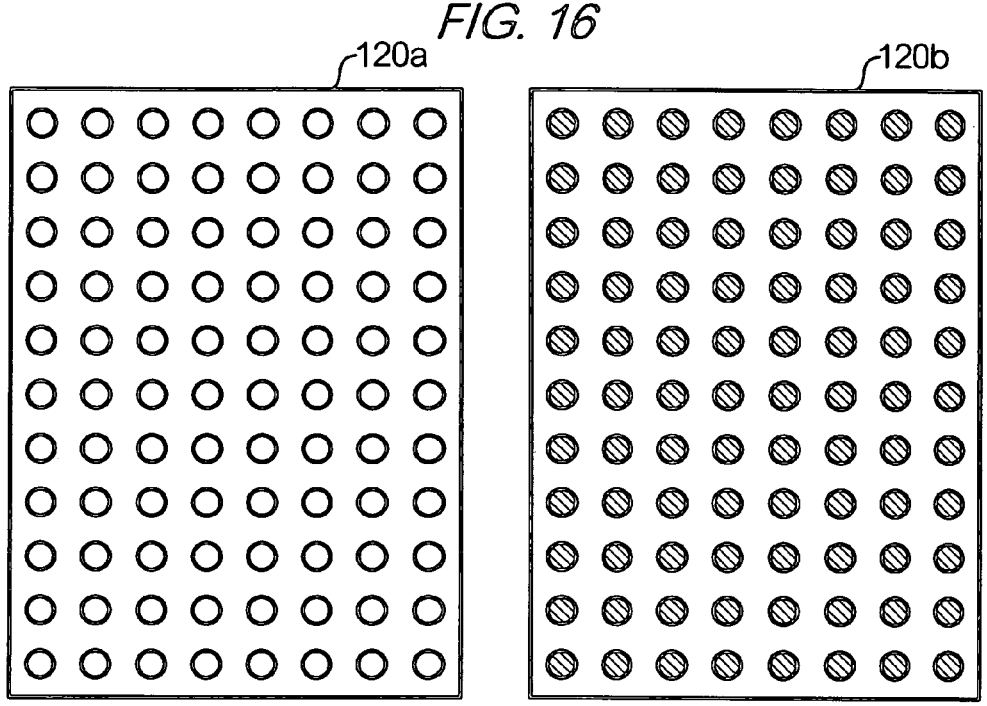
FIG. 16 is a diagram illustrating an example of a configuration of an electronic paper unit.

Also, in the above embodiments, as shown in FIG. 16, wireless sensors 200 of first sensor sheet 120*a* and second sensor sheet 120*b* may be arranged so that wireless sensors 200 of one sheet overlap with those of the other sheet as long as each wireless sensor 200 operates properly.

Figure 17:
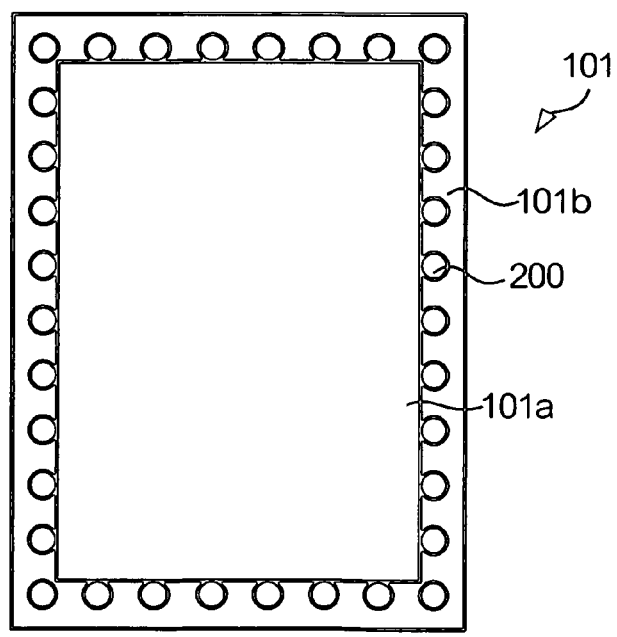
FIG. 17 is a diagram illustrating an example of a configuration of an electronic paper unit.

Also, electronic paper unit 100 may be configured as shown in FIG. 17. In the drawing, the reference number 101 indicates a sheet-like electronic paper unit. Electronic paper unit 101 has display area 101*a* which displays an image or a document and margin area 101*b* which surrounds display area 101*a*, and on margin area 101*b*, plural wireless sensors 200 are arranged. According to the configuration, a thinner electronic paper unit is realized.

4-2

Figure 18:
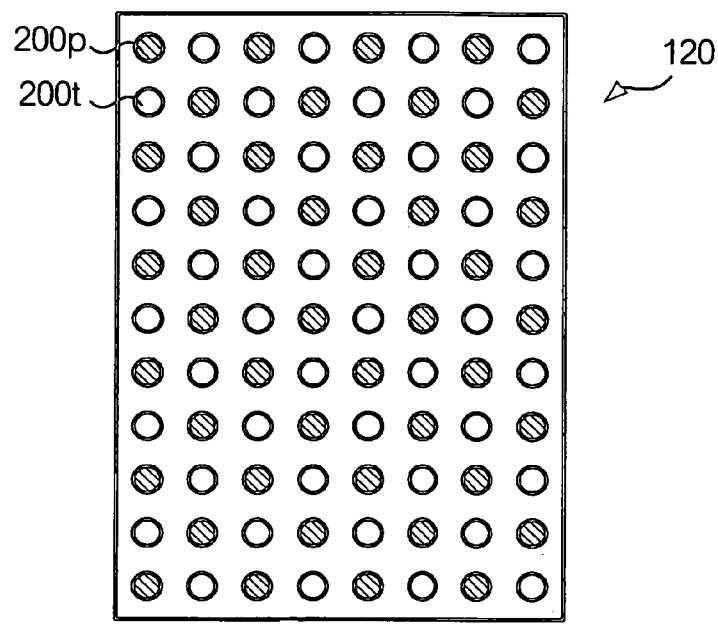
FIG. 18 is a diagram illustrating an example of a configuration of a sensor sheet.

In the above embodiments, instead of plural wireless sensors 200 of one type, plural wireless sensors 200 of different types may be arranged on one sheet as long as each wireless sensor 200 operates properly. For example, as shown in FIG. 18, temperature sensors 200*t* and pressure sensors 200*p* may be arranged in a hound's-tooth pattern. According to the configuration, since environmental conditions of plural types can be recognized by one sensor sheet 120, a thinner electronic paper unit is realized.

4-3

In the second embodiment, electronic paper 110 and sensor sheet 120 may be combined, instead of being held by brackets 130, in methods described above with reference to FIGS. 19 to 26.

Figure 19:
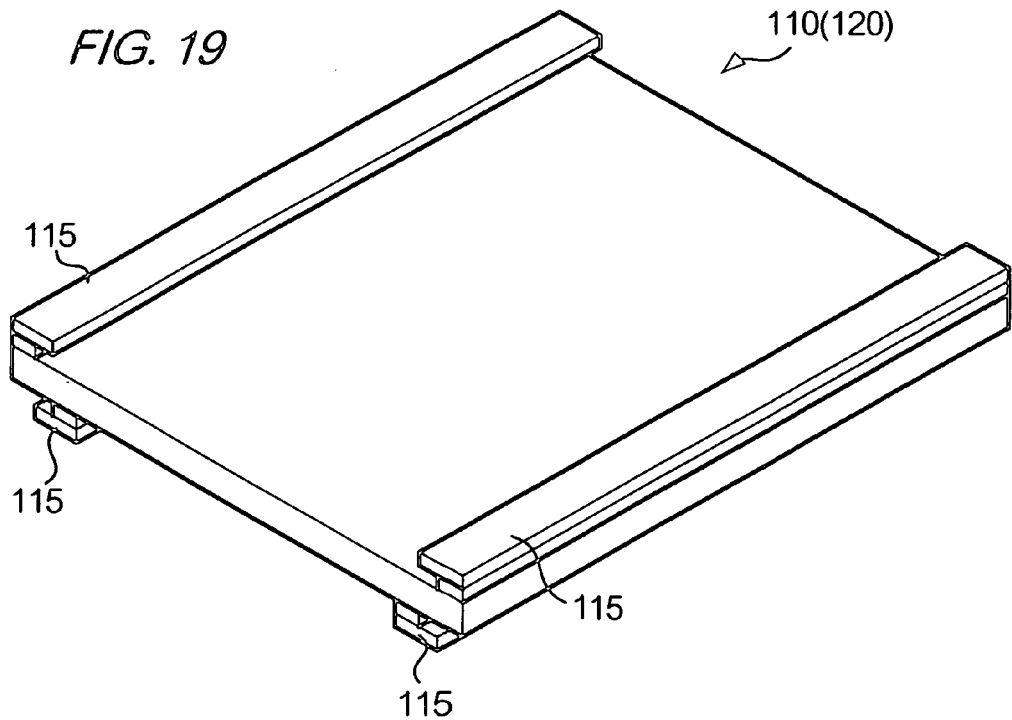
FIG. 19 is a perspective view illustrating an example of a configuration of an electronic paper.

FIG. 19 is a perspective view illustrating an external view of electronic paper 110. As shown in the drawing, on electronic paper 110, hook-like cross-section rails are formed along two opposing edges of electronic paper 110. Each rail 115 formed on the upper surface of electronic paper 110 has a ledge extending inwards, and each rail 115 formed on the under surface of electronic paper 110 has a ledge extending outwards.

Figure 20:
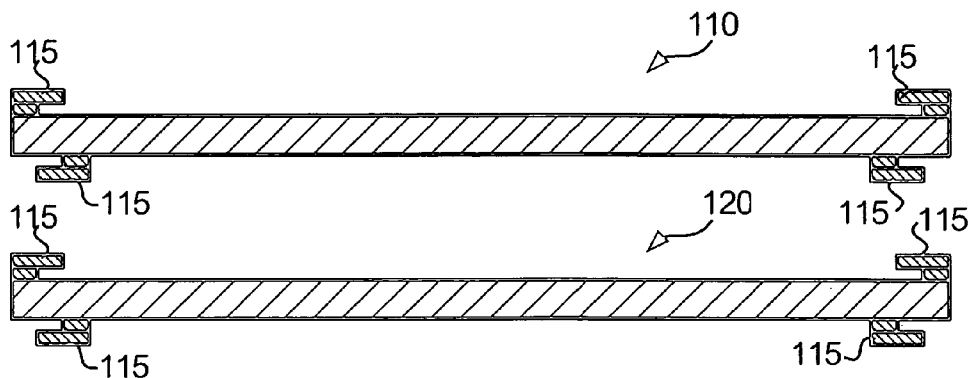
FIG. 20 is a sectioned diagram illustrating an example of a configuration of an electronic paper and a sensor sheet.
Figure 21:
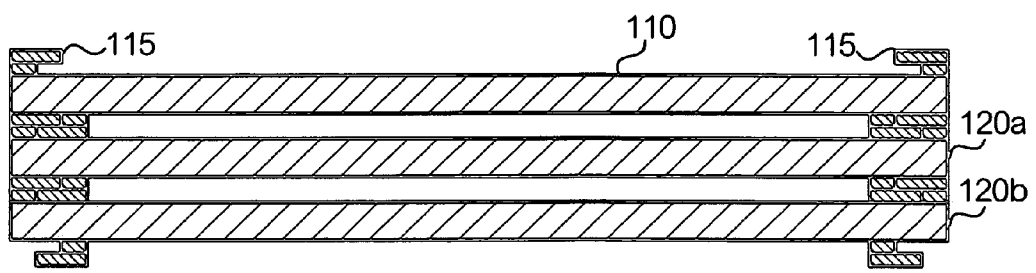
FIG. 21 is a diagram illustrating an example of a method of combining an electronic paper with a sensor sheet.

FIG. 20 is a sectioned diagram of electronic paper 110 and sensor sheet 120. As shown in the drawing, sensor sheet 120 is also configured to have rails 115 on the upper and under surface. When thus configured electronic paper 110 is attached to similarly configured sensor sheet 120, the ledges of under side rails 115 of electronic paper 110 are slid to the ditches of upper side rails 115 of sensor sheet 120. FIG. 21 is a sectioned diagram of electronic paper 110 and sensor sheet 120 attached to the paper.

Figure 22:
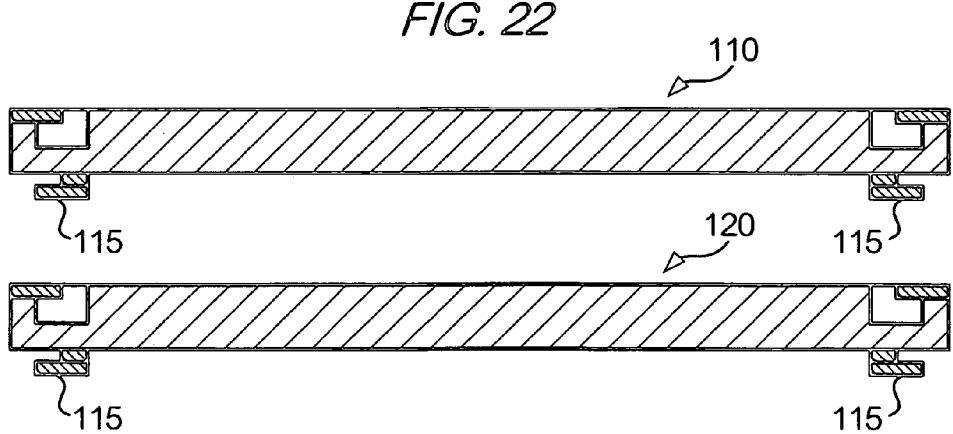
FIG. 22 is a sectioned diagram illustrating an example of a configuration of an electronic paper and a sensor sheet.
Figure 23:
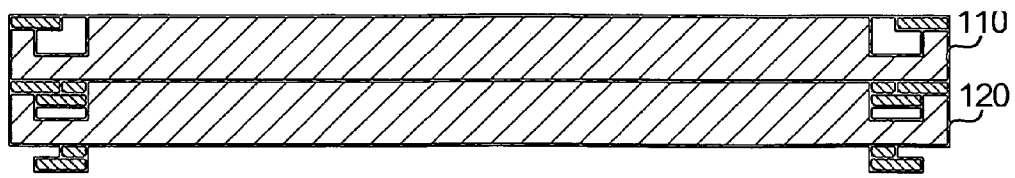
FIG. 23 is a diagram illustrating an example of a method of combining an electronic paper with a sensor sheet.

Also, electronic paper 110 and sensor sheet 120 may be configured to have rails 115 only on the under surface, and to have hook-like cross-section ditches on the upper surface as shown in FIG. 22. FIG. 23 is a sectioned diagram of electronic paper 110 and sensor sheet 120 attached to the paper.

Figure 24:
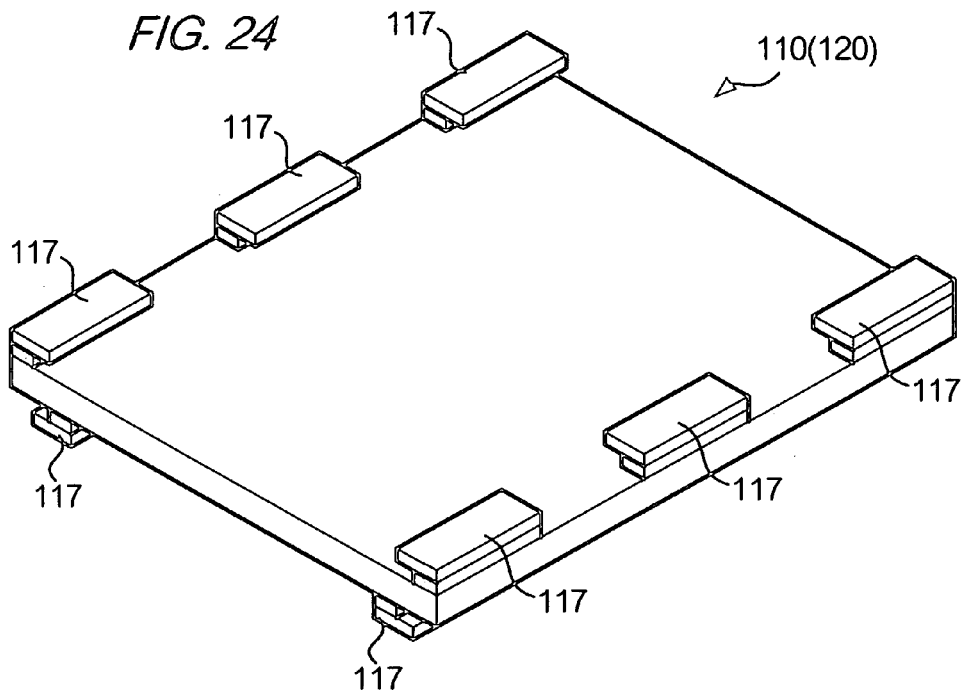
FIG. 24 is a perspective view illustrating an example of a configuration of an electronic paper.

Rail 115 may be formed on electronic paper 110 or sensor sheet 120 not contiguously but partially as shown in FIG. 24. In FIG. 24, three partial rails 117 are formed along each edge.

Figure 25:
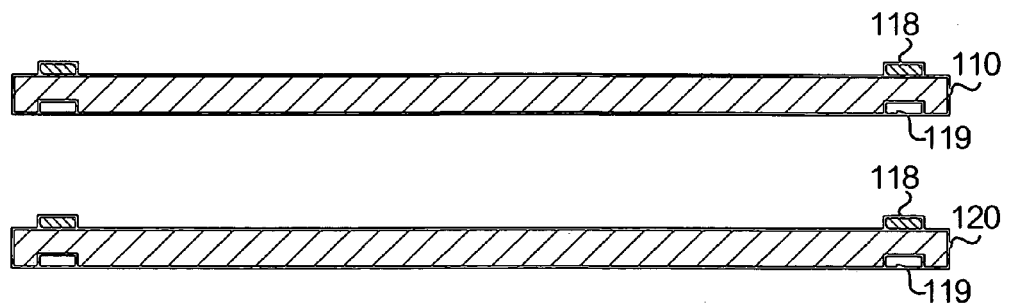
FIG. 25 is a sectioned diagram illustrating an example of a configuration of an electronic paper and a sensor sheet.
Figure 26:
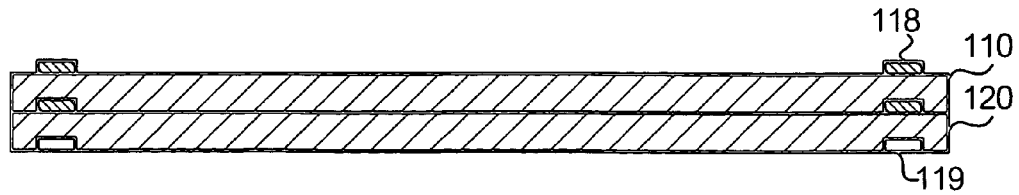
FIG. 26 is a diagram illustrating an example of a method of combining an electronic paper with a sensor sheet.

Also, as shown in FIGS. 25 and 26, electronic paper 110 and sensor sheet 120 may be configured to have circular salients 118 on the upper surface (or the under surface), and to have circular concaves 119 on the under surface (or the upper surface). When thus configured electronic paper 110 is attached to similarly configured sensor sheet 120 as shown in FIG. 26, circular salients 118 of sensor sheet 120 are fitted into circular concaves 119 of electronic paper 110, and thereby electronic paper 110 and sensor sheet 120 are combined.

Figure 27:
FIG. 27 is a sectioned diagram illustrating an example of a configuration of an electronic paper and a sensor sheet.

Also, electronic paper 110 and sensor sheet 120 may be configured to have fastening hardware 140 such as a hook and loop faster on one surface or both surfaces, as in electronic papers 110*a* and 110*b* and sensor sheets 120*a* and 120*b* shown in FIG. 27, and may be combined with fastening hardware 140.

4-4

In the above embodiments, sensor sheet 120 may be attached to a display medium such as plain paper, instead of electronic paper 110. If plain paper is used as a display medium, since sensor sheet 120 is detachable, it can be reused, consequently the cost associated with the use of a sensor sheet can be reduced.

4-5

In the second embodiment, sensor sheet 120 to be attached to electronic paper 110 need not necessarily be selected by a user from among plural types of sensor sheets 120, but may be predetermined or selected by controller 450 of image forming apparatus 400 on the basis of the content of data for image formation, etc. Also, only one type of sensor sheet 120 may be attached to electronic paper 110.

Also, in the second embodiment, sheet type data need not necessarily be sent from client machine 500 operated by a user, but may be inputted by a user directly by using an operation unit of image forming apparatus 400.

4-6

In the above embodiments, image forming apparatus 400 which forms an image on electronic paper may be replaced with an image forming apparatus which forms an image on plain paper or with an image forming apparatus which can form an image on both plain paper and electronic paper. A display medium on which an image is formed may be anything.

If the image forming apparatus which accepts both plain paper and electronic paper is used, its user can select the paper whether electronic or plain on which an image is formed, by using an operation unit of the apparatus or client machine 500. The image forming apparatus selects plain paper or electronic paper in accordance with the user's instructions, forms an image on the selected display medium, and attaches sensor sheet 120 to the display medium.

4-7

Figure 28:
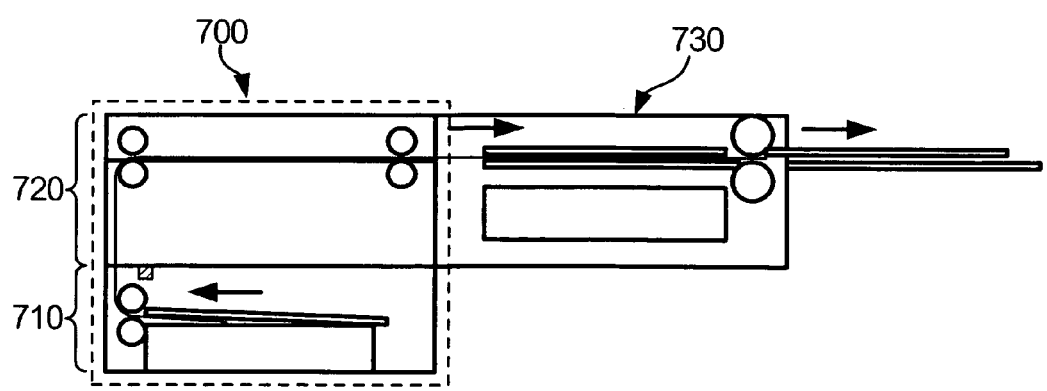
FIG. 28 is a diagram illustrating a configuration of an image forming apparatus.

In the second and third embodiments, the function of image forming apparatus 400 may be realized by providing an existing image forming apparatus with a sensor sheet attaching device. FIG. 28 is a diagram illustrating a configuration of an image forming apparatus with a sensor sheet attaching device.

In the drawing, the reference number 700 indicates an image forming apparatus such as a printer and a copier, which has display medium feeder 710 and image forming unit 720. The reference number 730 indicates a sensor sheet attaching device which attaches sensor sheet 120 to electronic paper 110 and is attachable to image forming apparatus 700.

By attaching sensor sheet attaching device 730 to existing image forming apparatus 700, it becomes possible to attach sensor sheet 120 to a display medium on which an image is formed by image forming apparatus 700 such as plain paper and electronic paper. Consequently, a display medium on which an image is formed by existing image forming apparatus 700 becomes enabled to recognize an environmental condition such as the surrounding temperature or the pressure applied to the display medium.

Sensor sheet attaching device 730 need not be attached to image forming apparatus 700, but may be used independently. In such a case, a user sets electronic paper 110 to sensor sheet attaching device 730, and sensor sheet attaching device 730 attaches sensor sheet 120 to electronic paper 110 automatically.

4-8

In the second and third embodiments, instead of management server machine 600, image forming apparatus 400 or client machine 500 may store ID management table TBL and manage electronic paper IDs and sensor sheet IDs.

Also, in the second and third embodiments, instead of image forming apparatus 400, client machine 500 or management server machine 600 may assign data ID to data for image formation such as document data and image data.

4-9

In the second and third embodiments, electronic paper 110 need not necessarily be identified on the basis of its electronic paper ID stored in RFID tag 111, but may be identified on the basis of a bar code printed on electronic paper 110.

4-10

In the above embodiments, each wireless sensor 200 may be identified by any method, which makes response signals from wireless sensors 200 distinguishable, other than a method of differentiating the frequencies of radio signals sent from wireless sensors 200.

Also, the waveform of a radio signal sent to wireless sensor 200 may be a sine wave, a chopping wave, etc. other than a sine wave.

4-11

In the above embodiments, a configuration of wireless sensor 200 may be modified as long as it can recognize an environmental condition properly.

4-12

In the above embodiments, each component of wireless sensor 200 may be made of other materials.

Board 1 of wireless sensor 200 may be made of: an elemental semiconductor such as Si, Ge, and diamond; glass; a III-V series compound semiconductor such as AlAs, AlSb, AlP, GaAs, GaSb, InP, InAs, InSb, AlGaP, AlLnP, AlGaAs, AllnAs, AlAsSb, GaInAs, GaInSb, GaAsSb, and InAsSb; a II-VI series compound semiconductor such as ZnS, ZnSe, ZnTe, CaSe, CdTe, HgSe, HgTe, and CdS; oxide such as Nb-doped or La-doped $SrTiO_3$, Al-doped ZnO, $In_2O_3$, $RuO_2$, $BaPbO_3$, $SrRuO_3$, $YBa_2Cu_3O_{7-x}$, $SrVO_3$, $LaNiO_3$, $La_{0.5}Sr_{0.5}CoO_3$, $ZnGa_2O_4$, $CdGa_2O_4$, $MgTiO_4$, and $MgTi_2O_4$, which are conducting or semi-conducting single crystal plate; and metal such as Pd, Pt. Al, Au, Ag. However, in view of the suitability to an existing semiconductor production process and the production cost, it is preferable to use Si, GaAs, glass as a material of board 1.

Dielectric film 2 may be made of: instead of $LiNbO_3$ or $LiTaO_3$, oxide such as $SiO_2$, $SrTiO_3$, $BaTiO_3$, $BaZrO_3$, $LaAlO_3$, $ZrO_2$, $Y_2O_3 8\%$-$ZrO_2$, MgO, $MgAl_2O_4$, $Al_2O_3$, ZnO; a tetragonal system, orthorhombic system, or pseudocubic system material such as $BaTiO_3$, $PbTiO_3$, $Pb_{1-x}La_x(Zr_yTi_{1-y})_{1-x/4}O_3$ (PZT, PLT, PLZT depending on the values of X and Y), $Pb(Mg_{1/3}Nb_{2/3})O_3$, $KNbO_3$, which are $ABO_3$-like perovskite-like; a ferroelectric such as $LiNbO_3$ and $LiTaO_3$ which are a pseudo-ilmenite structure; $SrXBa_{1-x}Nb_2O_6$ and $PbxBa_{1-x}Nb_2O_6$ which are tungsten-bronze-like. Dielectric film 2 may also be made of $Bi_4Ti_3O_{12}$, $Pb_2KNb_5O_{15}$, $K_3Li_2Nb_5O_{15}$, and a substitution dielectric of the enumerated ferroelectrics. Dielectric film 2 may be made of $ABO_3$-like perovskite-like oxide including Pb. Especially, among the materials, $LiNbO_3$, $LiTaO_3$, and ZnO are preferable because the change of the surface velocity of their surface acoustic wave and the change of their piezoelectric constant are outstanding. The thickness of dielectric film 2 may be selected in accordance with the intended use; however, generally, it ranges between 0.1 micrometer and 10 micrometers.

Dielectric film 2 may be epitaxial or may have a single orientation in view of the electromechanical coupling coefficient/piezoelectric coefficient of inter-digital transducer 3 and of the dielectric loss of antenna 4. Also, on dielectric film 2, a film including a III-V series semiconductor such as GaAs or carbon such as diamond may be formed. As a result, the surface velocity of a surface acoustic wave, the coupling coefficient, and the piezoelectric constant are improved.

4-13

In the above embodiments, as wireless sensor 200 arranged on sensor sheet 120, a humidity sensor, an acceleration sensor, or a light sensor may be used, instead of temperature sensor 200*t* and pressure sensor 200*p*. Below, the configurations of the humidity sensor, the acceleration sensor, and the light sensor will be described.

<Humidity Sensor>

To use wireless sensor 200 as a humidity sensor, $LiTaO_3$ is used as a material of dielectric film 2 of FIG. 3.

The surface of dielectric film 2 made of $LiTaO_3$ is spin coated with a cellulose acetate film of approximately 10 micrometers. Cellulose acetate has water absorbency and its relative permittivity changes by approximately 50 percent when relative humidity changes from 10 percent RH to 70 percent RH. Therefore, according to an experiment, when the humidity surrounding dielectric film 2 changes by 10 percent RH to 70 percent RH, the propagation velocity of a surface acoustic wave changes by 0.06 percent. If the temperature change of a measuring object is significant, the frequency of a surface acoustic wave may be corrected by using temperature sensor 200*t* in combination.

<Acceleration Sensor>

Figure 29A:
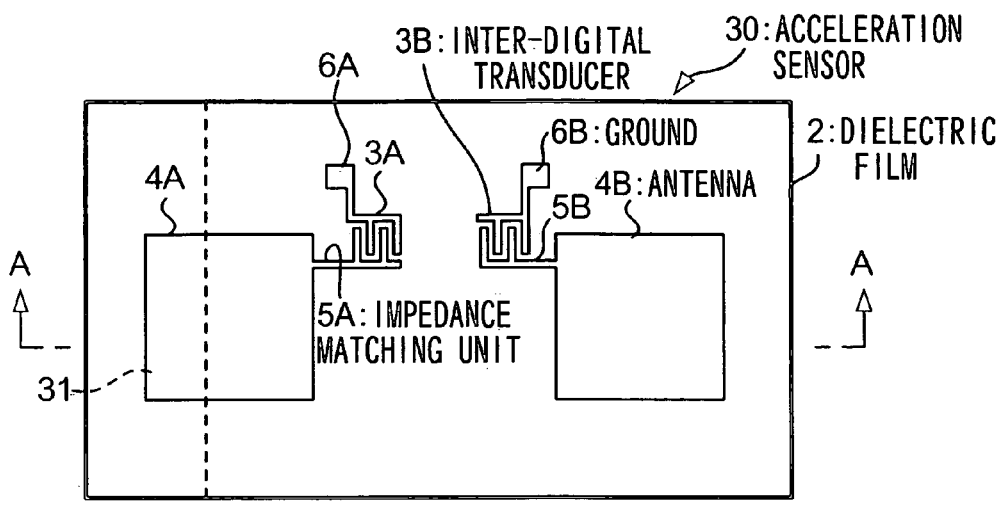
FIGS. 29A and 29B are diagrams illustrating a configuration of a wireless acceleration sensor.
Figure 29B:
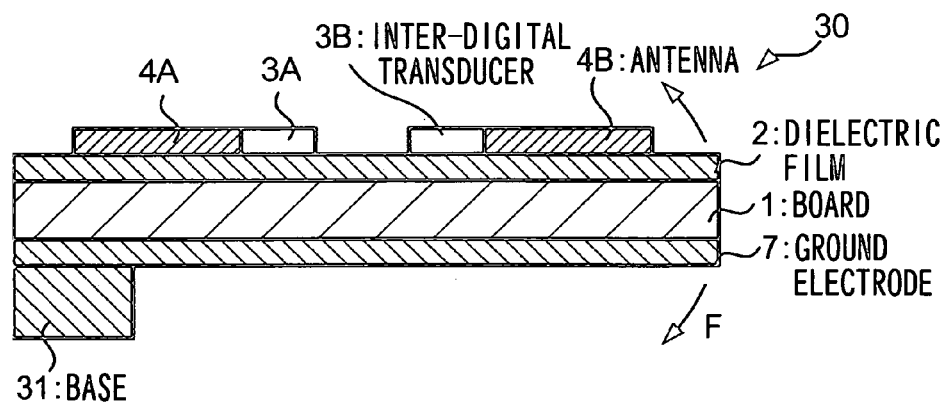

FIGS. 29A and 29B are diagrams illustrating a configuration of acceleration sensor 30. As shown in FIG. 29B, acceleration sensor 30 is different from a wireless sensor in having base 31 on its under surface, which supports one end of acceleration sensor 30. Accordingly, when a force F [$F=m \times \alpha$ (m: mass, $\alpha$: acceleration)] is exerted on the other end of board 1 of acceleration sensor 30, board 1 bends in response to the acceleration, and the bending is measured. In summary, acceleration sensor 30 functions as a strain gauge.

For example, if a force (acceleration: 980 m/s$^2$) is exerted on the other end of board 1 of acceleration sensor 30, board 1 bends in response to the acceleration. The bending causes the distance between inter-digital transducers 3A and 3B on dielectric film 2 to change, and thereby the velocity of a surface acoustic wave changes from a center frequency by 0.1 percent. If the temperature change of a measuring object is significant, the frequency of a surface acoustic wave may be corrected by using temperature sensor 200*t* in combination.

To use wireless sensor 200 as acceleration sensor 30, $LiTaO_3$ is used as a material of dielectric film 2 of FIG. 29.

<Light Sensor>

Figure 30:
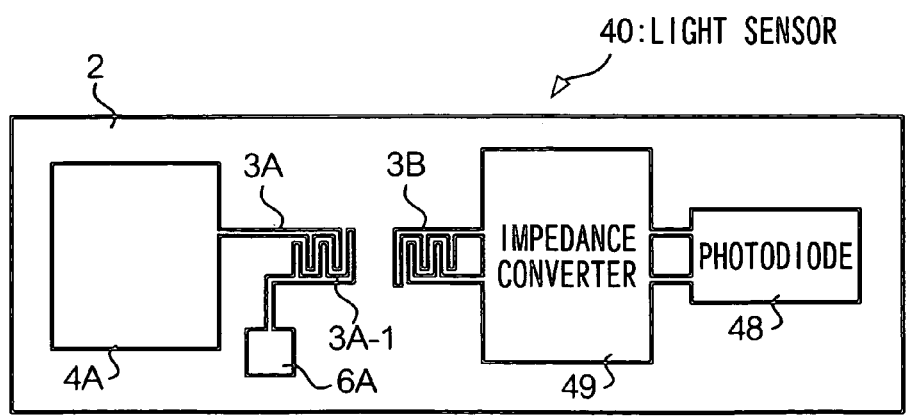
FIG. 30 is a diagram illustrating a configuration of a wireless light sensor.

FIG. 30 is a diagram illustrating a configuration of light sensor 40. As shown in the drawing, light sensor 40 is different from wireless sensor 200 in that one of inter-digital transducers 3A and 3B is connected to impedance converter 49 and photodiode 48 which is a light receiving element.

To use wireless sensor 200 as light sensor 40, $LiTaO_3$ is used as a material of dielectric film 2 of FIG. 30.

For example, when light (illuminance: 10001x) is irradiated on photodiode 48, the impedance of photodiode 48 changes in response to the luminous intensity. The impedance change of photodiode 48 causes the impedance of inter-digital transducer 3B to change via impedance converter 49 which matches impedances of photodiode 48 and inter-digital transducer 3B. Consequently, the reflection intensity of inter-digital transducer 3B in reflecting a surface acoustic wave propagated from inter-digital transducer 3A changes. As a result, the strength of a radio signal sent from light sensor 40 changes from a standard electric field strength by 0.1 percent.

As described above, the present invention provides a sheet with plural wireless measuring units, each of which, when a radio signal is sent, measures physical quantity surrounding itself by using the radio signal as an energy source, and generates and sends a radio signal having an attribute reflecting the measured physical quantity.

According to an embodiment of the invention, the physical quantity may be at least one of temperature, pressure, light, and acceleration.

According to another embodiment of the invention, each of the plural wireless measuring units may include: an exciter which receives a radio signal and generates a mechanical vibration; a vibration medium on which a surface acoustic wave is caused by a mechanical vibration generated by the exciter, and on which an attribute of the surface acoustic wave changes in response to physical quantity; and a transmitter which converts the surface acoustic wave generated on the vibration medium to an electrical signal and sends it as a radio signal.

Also, the present invention provides a display medium unit including: a sheet with plural wireless measuring units, each of which, when a radio signal is sent, measures physical quantity surrounding itself by using the radio signal as an energy source, and generates and sends a radio signal having an attribute reflecting the measured physical quantity; and a sheet-like display medium which is laid on the sheet.

According to an embodiment of the invention, the sheet may be detachable from the display medium.

According to another embodiment of the invention, the display medium may be an electronic paper.

According to another embodiment of the invention, each of the plural wireless measuring units may include: an exciter which receives a radio signal and generates a mechanical vibration; a vibration medium on which a surface acoustic wave is caused by a mechanical vibration generated by the exciter, and on which an attribute of the surface acoustic wave changes in response to physical quantity; and a transmitter which converts the surface acoustic wave generated on the vibration medium to an electrical signal and sends it as a radio signal.

Also, the present invention provides a sheet attaching device including: a sheet housing unit which houses plural sheets with plural wireless measuring units, each of which, when a radio signal is sent, measures physical quantity surrounding itself by using the radio signal as an energy source, and generates and sends a radio signal having an attribute reflecting the measured physical quantity; a sheet feeder which feeds a sheet-like display medium; and a sheet attaching unit which takes one or plural sheets out of the sheet housing unit, and attaches the one or plural sheets to a sheet-like display medium fed by the sheet feeder.

According to an embodiment of the invention, the sheet attaching device may further include a selector which selects a type of a sheet to be taken out of the sheet housing unit, and the sheet housing unit houses plural types of sheets; and the sheet attaching unit takes a sheet of a type selected by the selector out of the sheet housing unit, and attaches the sheet to a sheet-like display medium fed by the sheet feeder.

According to another embodiment of the invention, the sheet attaching device may further include: a receiver which receives a radio signal sent from a wireless measuring unit attached to a sheet; a sheet ID identifying unit which identifies a sheet ID of a sheet on the basis of a radio signal received by the receiver; a display medium ID reader which reads an ID of a display medium; a transmitter which transmits a display medium ID read by the display medium ID reader and a sheet ID identified by the sheet ID identifying unit to a predetermined communication apparatus in association with each other.

According to another embodiment of the invention, the sheet attaching device may further include: a receiver which receives a radio signal sent from a wireless measuring unit attached to a sheet; a sheet ID identifying unit which identifies a sheet ID of a sheet on the basis of a radio signal received by the receiver; a display medium ID reader which reads an ID of a display medium; a storage unit which stores a display medium ID read by the display medium ID reader and a sheet ID identified by the sheet ID identifying unit in association with each other.

Also, the present invention provides a sheet detaching device including a sheet detaching unit which detaches a sheet from a sheet-like display medium to which the sheet is attached, and the sheet has plural wireless measuring units, each of which, when a radio signal is sent, measures physical quantity surrounding itself by using the radio signal as an energy source, and generates and sends a radio signal having an attribute reflecting the measured physical quantity.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described to best explain the principles of the invention and its practical applications, to thereby enable others skilled in the art to understand various embodiments of the invention and various modifications thereof, to suit a particular contemplated use. It is intended that the scope of the invention be defined by the following claims and their equivalents.

What is claimed is:

1. A sheet comprising: a plurality of wireless measuring units, each of the plurality of wireless measuring units measuring at least one physical property of external environmental conditions surrounding the sheet, in response to receiving a first radio signal, wherein the plurality of wireless measuring units use the first radio signal as an energy source, and a frequency of the first radio signal is one of a plurality of frequencies, with each frequency activating the measurement of only one physical property of external environmental conditions surrounding the sheet, wherein the plurality of wireless measuring units generate and transmit a second radio signal comprising data indicating the at least one measured physical property, the sheet is used alongside an electronic paper, at least one physical property consists of at least one selected from the group consisting of temperature, pressure, light, and acceleration, the at least one physical property is measured by a propagation velocity of a surface acoustic wave, and the at least one physical property is displayed on said electronic paper.

2. A display medium unit comprising: a sheet comprising a plurality of wireless measuring units, each of the plurality of wireless measuring units measuring at least one physical property of external environmental conditions surrounding the sheet, in response to receiving a first radio signal, and a sheet-like display medium which is laid on the sheet, wherein the plurality of wireless measuring units use the first radio signal as an energy source, and a frequency of the first radio signal is one of a plurality of frequencies, with each frequency activating the measurement of only one physical property of external environmental conditions surrounding the sheet, the sheet is used alongside an electronic paper, wherein the plurality of wireless measuring units generate and transmit a second radio signal comprising data indicating the at least one measured physical property, and the at least one physical property consists of at least one selected from the group consisting of temperature, pressure, light, and acceleration, the at least one physical property is measured by a propagation velocity of a surface acoustic wave, and the at least one physical property is displayed on said electronic paper.

3. A display medium unit comprising:
   a sheet comprising a plurality of wireless measuring units, each of the plurality of wireless measuring units measuring at least one physical property of external environmental conditions surrounding the sheet, in response to receiving a first radio signal, and
   a sheet-like display medium which is laid on the sheet,
   wherein the plurality of wireless measuring units use the first radio signal as an energy source, and a frequency of the first radio signal can be one of a plurality of frequencies, with each frequency activating the measurement of one physical property of external environmental conditions surrounding the sheet,
   the sheet is used alongside an electronic paper,
   plurality of wireless measuring units generate and transmit a second radio signal comprising data indicating the at least one measured physical property,
   the at least one physical property consists of at least one selected from the group consisting of temperature, pressure, light, and acceleration, and
   the at least one physical property is measured by a propagation velocity of a surface acoustic wave.

4. A display medium unit according to claim 3, wherein the sheet is detachable from the display medium.

5. A display medium unit according to claim 3, wherein the display medium is an electronic paper.

6. A sheet attaching device comprising: a sheet housing unit which houses a plurality of sheets, each of the plurality of sheets comprising a plurality of wireless measuring units, each of the plurality of wireless measuring units measuring at least one physical property of external environmental conditions surrounding the sheet, in response to receiving a first radio signal; a sheet feeder which feeds a sheet-like display medium; and a sheet attaching unit which takes one or a plurality of sheets out of the sheet housing unit, and attaches the one or a plurality of sheets to a sheet-like display medium fed by the sheet feeder, wherein the plurality of wireless measuring units use the first radio signal as an energy source, the sheet is used alongside an electronic paper, the plurality of wireless measuring units generate and transmit a second radio signal comprising data indicating the at least one measured physical property, the at least one physical property consists of at least one selected from the group consisting of temperature, pressure, light, and acceleration, and the at least one physical property is measured by a propagation velocity of a surface acoustic wave, and the at least one physical property is displayed on said electronic paper.

7. A sheet attaching device comprising:
a sheet housing unit which houses a plurality of sheets, each of the plurality of sheets comprising a plurality of wireless measuring units, each of the plurality of wireless measuring units measuring at least one physical property of external environmental conditions surrounding the sheet, in response to receiving a first radio signal;
a sheet feeder which feeds a sheet-like display medium; and
a sheet attaching unit which takes one or a plurality of sheets out of the sheet housing unit, and attaches the one or a plurality of sheets to a sheet-like display medium fed by the sheet feeder,
wherein the plurality of wireless measuring units use the first radio signal as an energy source,
the sheet is used alongside an electronic paper,
the plurality of wireless measuring units generate and transmit a second radio signal comprising data indicating the at least one measured physical property,
the at least one physical property consists of at least one selected from the group consisting of temperature, pressure, light, and acceleration, and
the at least one physical property is measured by a propagation velocity of a surface acoustic wave.

8. A sheet attaching device according to claim 7, further comprising
a selector which selects a type of a sheet to be taken out of the sheet housing unit, and
wherein: the sheet housing unit houses a plurality of types of sheets; and the sheet attaching unit takes a sheet of a type selected by the selector out of the sheet housing unit, and attaches the sheet to a sheet-like display medium fed by the sheet feeder.

9. A sheet attaching device according to claim 7, further comprising:
a receiver which receives a radio signal sent from a wireless measuring unit attached to a sheet;
a sheet ID identifying unit which identifies a sheet ID of a sheet on the basis of a radio signal received by the receiver;
a display medium ID reader which reads an ID of a display medium; and
a transmitter which transmits a display medium ID read by the display medium ID reader and a sheet ID identified by the sheet ID identifying unit to a predetermined communication apparatus in association with each other.

10. A sheet detaching device comprising: a sheet detaching unit which detaches a sheet from a sheet-like display medium to which the sheet is attached, wherein the sheet comprises a plurality of wireless measuring units, each of the plurality of wireless measuring units measuring at least one physical property of external environmental conditions surrounding the sheet, in response to receiving a first radio signal, the sheet is used alongside an electronic paper, wherein the plurality of wireless measuring units use the first radio signal as an energy source, the plurality of wireless measuring units generate and transmit a second radio signal comprising data indicating the at least one measured physical property, and at least one physical property consists of at least one selected from the group consisting of temperature, pressure, light, and acceleration, and the at least one physical property is measured by a propagation velocity of a surface acoustic wave, and the at least one physical property is displayed on said electronic paper.

11. A sheet detaching device comprising:
a sheet detaching unit which detaches a sheet from a sheet-like display medium to which the sheet is attached,
wherein the sheet comprises a plurality of wireless measuring units, each of the plurality of wireless measuring units measuring at least one physical property of external environmental conditions surrounding the sheet, in response to receiving a first radio signal,
the sheet is used alongside an electronic paper,
plurality of wireless measuring units use the first radio signal as an energy source,
the plurality of wireless measuring units generate and transmit a second radio signal comprising data indicating the at least one measured physical property, and
the at least one physical property consists of at least one selected from the group consisting of temperature, pressure, light, and acceleration, and
the at least one physical property is measured by a propagation velocity of a surface acoustic wave.

12. A sheet according to claim 1, wherein the first radio signal is sent from an external transmitter, and the second radio signal is sent to an external receiver.

13. A sheet according to claim 1, further comprising a second sheet placed on the sheet, the second sheet having a plurality of measuring units that are a different type than a type of the measuring units of the sheet, the measuring units of the second sheet being positioned so as to not overlap with the measuring units of the sheet.

14. A display medium unit of claim 3, further comprising a second sheet placed on the sheet, the second sheet having a plurality of measuring units that are a different type than a type of the measuring units of the sheet, the measuring units of the second sheet being positioned so as to not overlap with the measuring units of the sheet.

15. A sheet attaching device of claim 7, further comprising a second sheet placed on the sheet, the second sheet having a plurality of measuring units that are a different type than a type of the measuring units of the sheet, the measuring units of the second sheet being positioned so as to not overlap with the measuring units of the sheet.

16. A sheet detaching device of claim 11, further comprising a second sheet placed on the sheet, the second sheet having a plurality of measuring units that are a different type than a type of the measuring units of the sheet, the measuring units of the second sheet being positioned so as to not overlap with the measuring units of the sheet.

17. A sheet according to claim 1, wherein the plurality of wireless measuring units are arranged uniformly on the sheet.

18. A display medium unit of claim 3, wherein the plurality of wireless measuring units are arranged uniformly on the sheet.

19. A sheet attaching device of claim 7, wherein the plurality of wireless measuring units are arranged uniformly on the sheet.

20. A sheet detaching device of claim 11, wherein the plurality of wireless measuring units are arranged uniformly on the sheet.

* * * * *